United States Patent
Sami et al.

(10) Patent No.: US 9,066,279 B2
(45) Date of Patent: Jun. 23, 2015

(54) SYSTEM ACQUISITION AT A MOBILE DEVICE

(71) Applicant: QUALCOMM Incorporated, San Diego, CA (US)

(72) Inventors: Mohd Abdullah Sami, Hyderabad (IN); Anand Rajurkar, Hyderabad (IN); Manjunatha Subbamma Ananda, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 221 days.

(21) Appl. No.: 13/779,341

(22) Filed: Feb. 27, 2013

(65) Prior Publication Data

US 2014/0241184 A1   Aug. 28, 2014

(51) Int. Cl.
*H04W 48/16* (2009.01)
*H04W 36/24* (2009.01)

(52) U.S. Cl.
CPC .............. *H04W 48/16* (2013.01); *H04W 36/24* (2013.01)

(58) Field of Classification Search
None
See application file for complete search history.

(56) References Cited

U.S. PATENT DOCUMENTS

| 5,539,748 | A  | * | 7/1996  | Raith .......................... 370/329 |
| 6,343,070 | B1 |   | 1/2002  | Klas et al. |
| 6,466,802 | B1 |   | 10/2002 | Blakeney, II et al. |
| 7,805,574 | B2 |   | 9/2010  | Bell et al. |
| 7,826,844 | B2 |   | 11/2010 | Cooper |
| 8,060,106 | B1 |   | 11/2011 | Lan |
| 2002/0006805 | A1 | * | 1/2002 | New et al. ...................... 455/525 |
| 2004/0106408 | A1 | * | 6/2004 | Beasley et al. ................ 455/436 |
| 2008/0049702 | A1 |   | 2/2008 | Meylan et al. |
| 2011/0149937 | A1 |   | 6/2011 | Gupta et al. |
| 2013/0258934 | A1 | * | 10/2013 | Amerga et al. ............... 370/312 |

FOREIGN PATENT DOCUMENTS

EP    1463347 A1    9/2004

OTHER PUBLICATIONS

International Search Report and Written Opinion—PCT/US2014/017752—ISA/EPO—Jul. 7, 2014.
Kwok Y-K.R., et al., "CDMA (IS-95)" In: "Wireless Internet and Mobile Computing", Aug. 17, 2007,John Wiley & Sons, Inc., Hoboken, NJ, USA, XP055123456, ISBN: 978-0-47-167968-4, Chapter 6, pp. 133-174, DOI:10.1002/9780470167960.

* cited by examiner

*Primary Examiner* — Kerri Rose
(74) *Attorney, Agent, or Firm* — Knobbe, Martens, Olson & Bear LLP

(57) ABSTRACT

Methods, systems, and devices are described for system acquisition at a mobile device. A scan list including a plurality of entries may be stored at the mobile device. Each entry may include at least one connection parameter for connecting to a cellular system associated with the entry. A connection may be established with a target cellular system at the mobile device. A connection time with the target cellular system may be measured at the mobile device. A time-based entry including at least one connection parameter for the target cellular system may be added to the scan list based at least in part on the measured connection time with the target cellular system. Other aspects, embodiments, and features are also claimed and described.

43 Claims, 13 Drawing Sheets

SYSTEM ACQUISITION AT A MOBILE DEVICE

TECHNICAL FIELD

The technology discussed below relates generally to wireless communication, and more specifically to systems, devices, and methods for system acquisition at a mobile device.

BACKGROUND

Cellular communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A cellular multiple-access communications system may include a number of base stations, each simultaneously supporting communication for multiple mobile devices. Many mobile devices maintain databases of information used to identify and connect to cellular systems. For example, a mobile device may store a Most Recently Used (MRU) database and a Preferred Roaming List (PRL) database. The MRU database may store identification and connection information (e.g., identifiers, bands, etc.) for a fixed number of cellular systems on which the mobile device most recently camped. The PRL database may store a prioritized list of cellular systems for various service providers, including roaming service providers, and information for discovering and connecting to each stored service provider.

When the mobile device searches for a cellular system (e.g., upon powering up, moving into a new area, etc.), the mobile device may populate a scan list according to the prioritized order of entries in the MRU database, to determine whether any of the cellular systems identified in the MRU database are available. If the mobile device finds that one of the systems specified in the MRU database is available, the mobile device may connect to and camp on that system. If none of the systems specified in the MRU database are available, the mobile device may scan entries from the PRL database appearing in the scan list, which entries are typically greater in number than the entries in the MRU database. It can therefore take longer to connect to a cellular system when a mobile device has to scan entries corresponding to the PRL database.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to a first set of illustrative embodiments, a method for system acquisition is described. In one configuration, a scan list including a plurality of entries may be stored at the mobile device. Each entry may include at least one connection parameter for connecting to a cellular system associated with the entry. A connection may be established with a target cellular system at the mobile device. A connection time with the target cellular system may be measured at the mobile device. A time-based entry including at least one connection parameter for the target cellular system may be added to the scan list based at least in part on the measured connection time with the target cellular system.

In certain examples, the measured connection time with the target cellular system may be compared to a threshold, and the addition of the time-based entry to the scan list may be based at least in part on a determination that the measured connection time with the target cellular system is greater than the threshold. Additionally or alternatively, the measured connection time with the target cellular system may be compared to a connection time associated with at least one other time-based entry of the scan list, and the addition of the time-based entry to the scan list may be based at least in part on a determination that the measured connection time with the target cellular system is greater than the connection time associated with the at least one other time-based entry of the scan list.

In certain examples, the scan list may include a plurality of most recently used (MRU) entries and a plurality of time-based entries. An MRU entry with the at least one connection parameter for the target cellular system may also be added to the scan list. In certain examples, the entries of the scan list may be arranged such that the plurality of time-based entries is positioned in the scan list after a plurality of MRU entries. In certain examples, the illustrative method may further include disconnecting from the target cellular system, and scanning the entries of the scan list to determine whether at least one of the entries of the scan list identifies a cellular system that is currently available to the mobile device. In certain examples, the plurality of time-based entries of the scan list may be scanned after the plurality of MRU entries of the scan list. In certain examples, a plurality of preferred roaming list (PRL) entries of the scan list may be scanned after the plurality of time-based entries of the scan list. In certain examples, the plurality of time-based entries of the scan list may be arranged such that the time-based entries are ordered according to a connection time associated with each time-based entry.

In certain examples, an expiration may be associated with the time-based entry. IN certain examples, the measured connection time with the target cellular system may include a cumulative elapsed time of a plurality of separate connection sessions between the mobile device and the target cellular system. In certain examples, the measured connection time with the target cellular system may include an elapsed time of a single connection session between the mobile device and the target cellular system.

In certain examples, the at least one connection parameter associated with each entry may include one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

According to a second set of illustrative embodiments, a mobile device may include a scanning module configured to store a scan list comprising a plurality of entries at the mobile device, each entry comprising at least one connection parameter for connecting to a cellular system associated with the entry; and a connection module configured to establish a connection with a target cellular system at the mobile device and measure a connection time with the target cellular system. The scanning module may be further configured to add a time-based entry comprising at least one connection parameter for the target cellular system to the scan list based at least in part on the measured connection time with the target cellular system.

In certain examples, the scanning module may be further configured to compare the measured connection time with the target cellular system to a threshold, and the adding the time-based entry to the scan list may be based at least in part on a determination that the measured connection time with the target cellular system is greater than the threshold. Additionally or alternatively, the scanning module may be further configured to compare the measured connection time with the target cellular system to a connection time associated with at least one other time-based entry of the scan list, and the adding the time-based entry to the scan list may be based at least in part on a determination that the measured connection time with the target cellular system is greater than the connection time associated with the at least one other time-based entry of the scan list.

In certain examples, the scan list may include a plurality of most recently used (MRU) entries and a plurality of time-based entries. In certain examples, the scanning module may be further configured to: add an MRU entry with the at least one connection parameter for the target cellular system to the scan list. In certain examples, the scanning module may be further configured to arrange the entries of the scan list such that the plurality of time-based entries is positioned in the scan list after a plurality of MRU entries.

In certain examples, the connection module may be further configured to disconnect from the target cellular system, and the scanning module may be further configured to scan each entry of the scan list to determine whether at least one of the entries of the scan list identifies a cellular system that is currently available to the mobile device. In certain examples, the scanning module may be further configured to scan the plurality of time-based entries of the scan list after the plurality of MRU entries of the scan list. The scanning module may be further configured to scan a plurality of preferred roaming list (PRL) entries of the scan list after the plurality of time-based entries.

In certain examples, the scanning module may be further configured to arrange the plurality of time-based entries in the scan list such that the time-based entries are ordered according to a connection time associated with each time-based entry. The scanning module may be further configured to associate an expiration with the time-based entry.

In certain examples, the measured connection time with the target cellular system may include a cumulative elapsed time of a plurality of separate connection sessions between the mobile device and the target cellular system, and the measured connection time with the target cellular system may include an elapsed time of a single connection session between the mobile device and the target cellular system.

In certain examples, the at least one connection parameter associated with each entry comprises one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

According to a third set of illustrative embodiments, a mobile device apparatus may include: means for storing a scan list comprising a plurality of entries at the mobile device, each entry comprising at least one connection parameter for connecting to a cellular system associated with the entry; means for establishing a connection with a target cellular system at the mobile device; means for measuring a connection time with the target cellular system at the mobile device; and means for adding a time-based entry comprising at least one connection parameter for the target cellular system to the scan list based at least in part on the measured connection time with the target cellular system.

In certain examples, the mobile device apparatus may include means for comparing the measured connection time with the target cellular system to a threshold; and the adding the time-based entry to the scan list may be based at least in part on a determination that the measured connection time with the target cellular system is greater than the threshold. Additionally or alternatively, the mobile device may include means for comparing the measured connection time with the target cellular system to a connection time associated with at least one other time-based entry of the scan list, and the adding the time-based entry to the scan list may be based at least in part on a determination that the measured connection time with the target cellular system is greater than the connection time associated with the at least one other time-based entry of the scan list.

In certain examples, the scan list may include a plurality of most recently used (MRU) entries and a plurality of time-based entries. The mobile device apparatus may include: means for adding a most recently used (MRU) entry with the at least one connection parameter for the target cellular system to the scan list. In certain examples, the mobile device apparatus may further include: means for arranging the entries of the scan list such that the plurality of time-based entries is positioned in the scan list after a plurality of MRU entries. The mobile device apparatus may further include: means for disconnecting from the target cellular system, and means for scanning each entry of the scan list to determine whether at least one of the entries of the scan list identifies a cellular system that is currently available to the mobile device. The means for scanning the entries of the scan list may include means for scanning the plurality of time-based entries of the scan list after the plurality of MRU entries of the scan list. Additionally or alternatively, the means for scanning the entries of the scan list may include means for scanning a plurality of preferred roaming list (PRL) entries of the scan list after the plurality of time-based entries of the scan list.

In certain examples, the mobile device apparatus may include means for arranging the plurality of time-based entries of the scan list such that the time-based entries are ordered according to a connection time associated with each time-based entry. In certain examples, the mobile device apparatus may include means for associating an expiration with the time-based entry. In certain examples, the measured connection time with the target cellular system may include a cumulative elapsed time of a plurality of separate connection sessions between the mobile device and the target cellular system, and/or an elapsed time of a single connection session between the mobile device and the target cellular system In certain examples, the at least one connection parameter associated with each entry comprises one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

According to a fourth set of illustrative embodiments, a computer program product may include a computer readable storage device having computer readable instructions stored thereon. The computer readable instructions may include:

computer readable instructions configured to cause at least one processor to store a scan list comprising a plurality of entries at the mobile device, each entry comprising at least one connection parameter for connecting to a cellular system associated with the entry; computer readable instructions configured to cause the at least one processor to establish a connection with a target cellular system at the mobile device; computer readable instructions configured to cause the at least one processor to measure a connection time with the target cellular system at the mobile device; and computer readable instructions configured to cause the at least one processor to add a time-based entry comprising at least one connection parameter for the target cellular system to the scan list based at least in part on the measured connection time with the target cellular system.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

System acquisition at a mobile device (e.g., the acquisition of system information for and/or connection to a cellular system after a loss of service or upon power up) has previously been aided by a mobile device's maintenance of an MRU database. The MRU database may store the identities of cellular systems on which the mobile device has most recently become idle (or "camped"). When the mobile device loses service and needs to acquire system information for a currently available cellular system, the mobile device may first scan the entries in the MRU database. However, in some cases, such as in the case of a loss of power due to the mobile device's battery dying, it may be appropriate for the mobile device to acquire system information for a cellular system that is unlikely to be contained in the MRU database. In the past, the mobile device has had to resort to scanning for systems identified in a much larger PRL database. However, a mobile device will often be charged at a location where the mobile device camps for longer periods of time, such as, at the device user's home or work environment. The time needed to acquire system information for a currently available system can therefore be decreased, in some cases, by maintaining a list of cellular systems on which the mobile device camps with longer connection times, as would be expected for the cellular systems providing cellular coverage to the device user's home or work environments.

The following description provides examples of system acquisition of a mobile device, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

For the purposes of the present description and the appended claims, the term "connect," when used in the context of a mobile device and a cellular system or network, refers to the mobile device finding full service on the system or network and successfully registering on the system or network. "Full service" refers to service that is not limited or forbidden to the mobile device. The term "connection time" refers to an amount of time that the mobile device has remained registered (or "camped") on the system or network.

Figure 1:
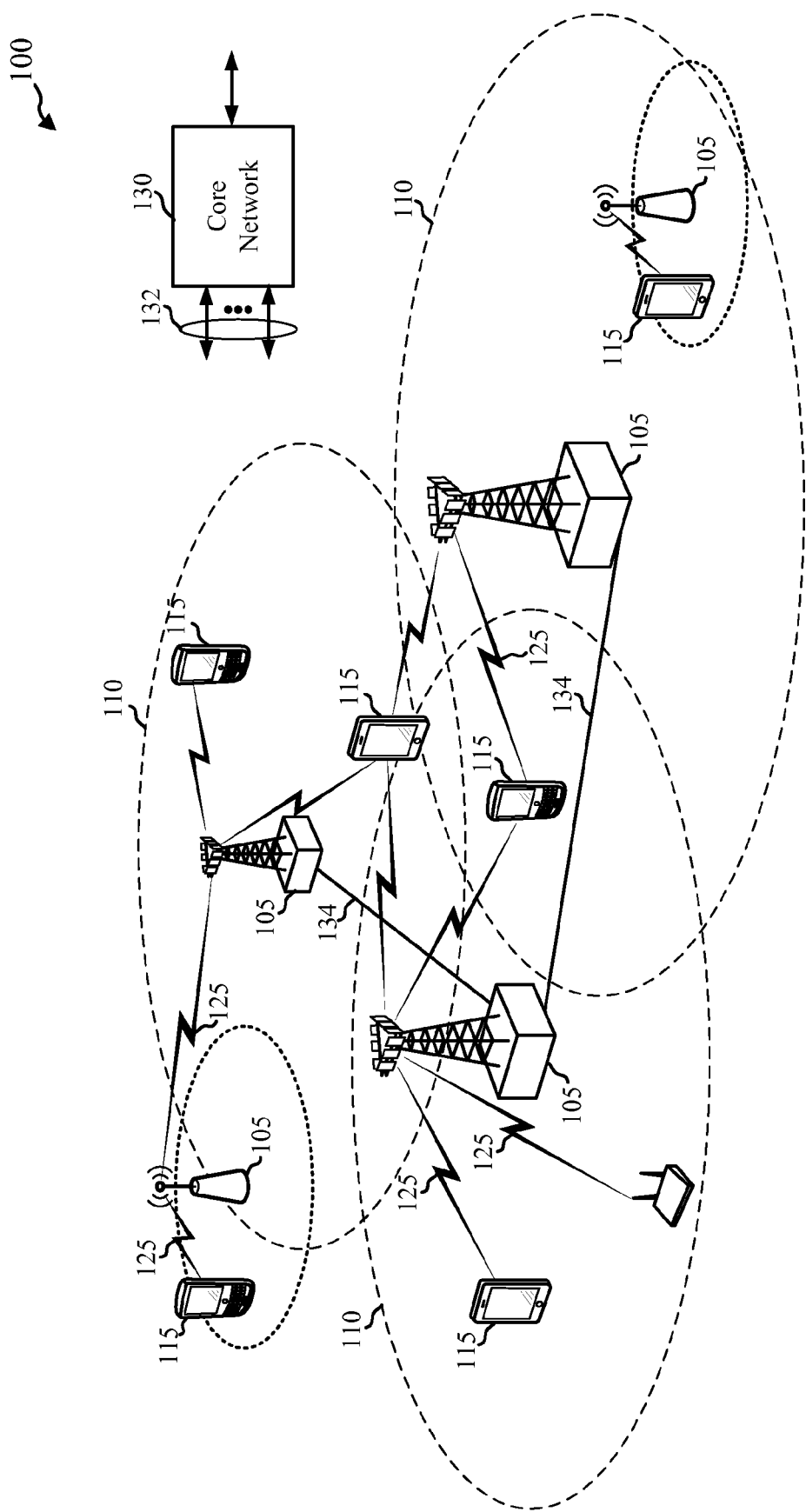
FIG. 1 shows a block diagram of a cellular communications system in accordance with various embodiments.

Referring first to FIG. 1, a diagram illustrates an example of a cellular communications system ("cellular system") 100. The cellular system 100 includes one or more base stations (or cells) 105, one or more mobile communications devices ("mobile devices") 115, and a core network 130. The base stations 105 may communicate with the mobile devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The cellular system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 may provide communication coverage for a respective geographic area 110. In some embodiments, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The coverage area 110 for a base station 105 may be divided into sectors making up only a portion of the coverage area. The cellular system 100 may include base stations 105 of different types (e.g., macro, micro, and/or pico base stations). There may be overlapping coverage areas for different technologies.

In some embodiments, the cellular system 100 may be a 3rd Generation Partnership Project (3GPP) Long Term Evolution (LTE) or LTE-Advanced (LTE-A) network. In LTE/LTE-A networks, the terms evolved Node B (eNB) and user equipment (UE) may be generally used to describe the base stations 105 and mobile devices 115, respectively. The cellular system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The cellular system 100 may support synchronous or asynchronous operation. For synchronous operation, the eNBs 105 may have similar frame timing, and transmissions from different eNBs 105 may be approximately aligned in time. For asynchronous operation, the eNBs 105 may have different frame timing, and transmissions from different eNBs 105 may not be aligned in time. The techniques described herein may be used for either synchronous or asynchronous operations.

The UEs 115 may be dispersed throughout the cellular system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in network 100 may include uplink transmissions, from a UE 115 to an eNB 105, and/or downlink transmissions, from an eNB 105 to a UE 115. The downlink transmissions may also be called forward link transmissions while the uplink transmissions may also be called reverse link transmissions. While the wireless communications system 100 is described in relation to LTE/LTE-A architectures, those skilled in the art will readily appreciate that the various concepts presented throughout this disclosure may be extended to other types of wireless networks.

As discussed above, mobile devices 115 may transition between cellular systems 100. For example, a mobile device 115 may move out of the coverage area of the cellular system 100 and into the coverage area of a separate cellular system. In other examples, a mobile device 115 may boot up and look for a cellular system to join. In these scenarios, the mobile device 115 may scan MRU and PRL portions of a stored scan list to identify a suitable cellular system to join.

In many cases, the MRU portion may be shorter than the PRL portion and scanned before the PRL component. Accordingly, the time to identify and connect to a cellular system listed in the MRU portion of the scan list may be less than the time to identify and connect to a cellular system listed in the PRL portion of the scan list. Nevertheless, one or more cellular systems to which the mobile device 115 frequently connects may not be present in the MRU portion of the scan list. To address this issue and reduce the time associated with connecting to such cellular systems, the present application discloses the addition of a time-based component to the scan list of the mobile device. The time-based component may store connection parameters for one or more cellular systems to which the mobile device 115 has recently connected based on the amount of time the mobile device 115 has camped on each system. In certain examples, the time-based component of the scan list may be scanned after the MRU portion, but before the PRL portion of the scan list. In this way, the mobile device 115 may still detect and connect to a frequently accessed cellular system that is not present in the MRU portion of the scan list before resorting to the time-consuming process of scanning the PRL list.

Figure 2:
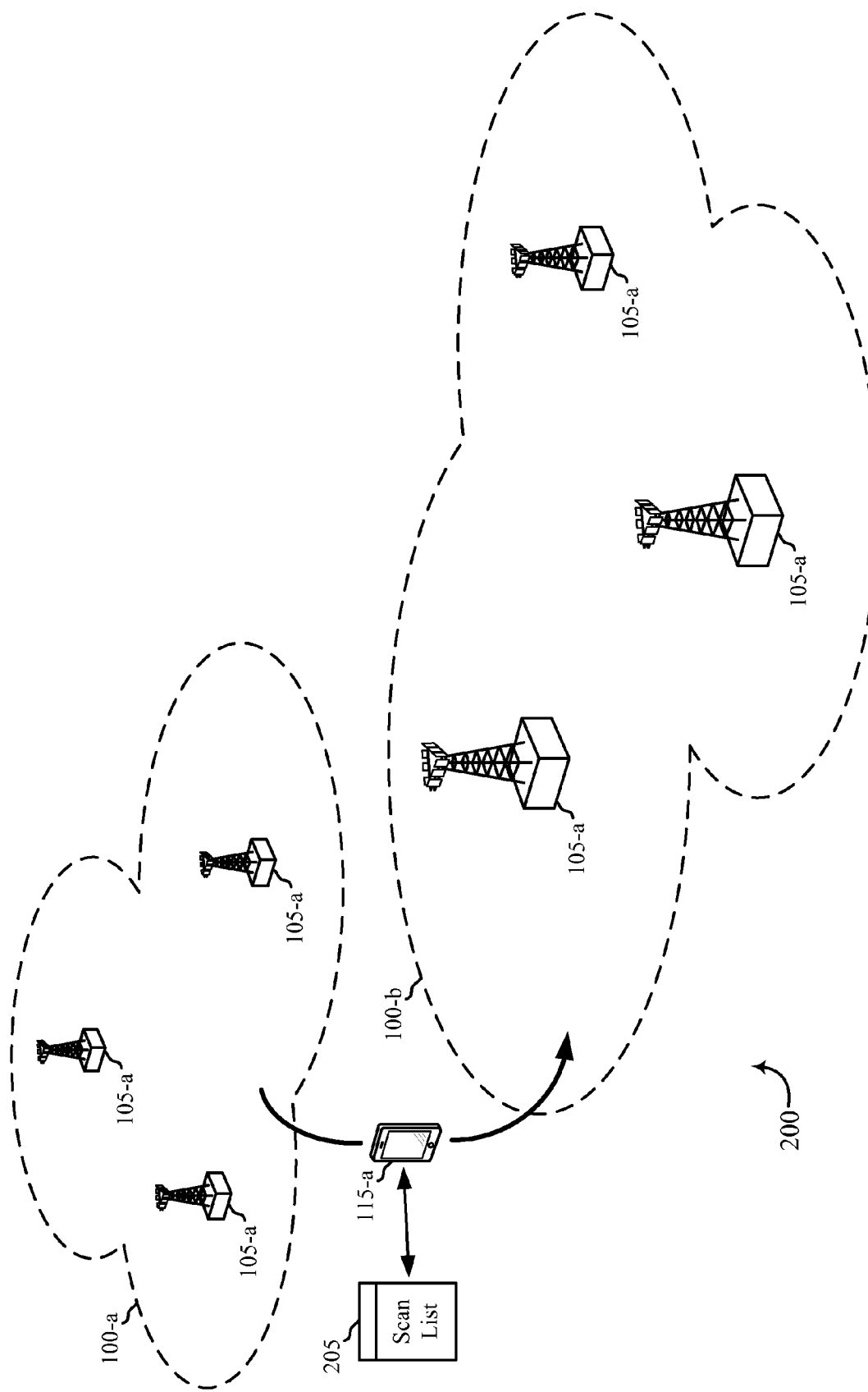
FIG. 2 shows an example of a mobile device moving between first and second cellular systems, in accordance with various embodiments.

FIG. 2 illustrates an example 200 of a mobile device 115-a moving between first and second cellular systems 100-a and 100-b. The mobile device 115-a may be an example of one or more aspects of a mobile device or UE 115 described with reference to FIG. 1. The cellular systems 100-a and 100-b may be examples of different instances of the cellular system 100. By way of example, each of the cellular systems 100-*a* and 100-*b* is shown to include three base stations 105-*a*, though in some cases, either cellular system 100-*a*, 100-*b* might include more or fewer base stations 105-*a*.

The cellular systems 100-*a*, 100-*b* may utilize the same or different radio access technologies (RATs). In some cases one, or both of the cellular systems 100-*a*, 100-*b* may be a code division multiple access (CDMA), High Data Rate (HDR). LTE, Global System for Mobile Communications (GSM) or Wideband CDMA (WCDMA) system. In cases where the cellular systems 100-*a*, 100-*b* utilize the same RAT, the systems 100-*a*, 100-*b* may utilize the same or different connection parameters or other connection information.

Consider now that the mobile device 115-*a* has become idle ("camped") on the first cellular system 100-*a* and added connection information (e.g., identifiers, bands, etc.) for the first cellular system 100-*a* to an MRU database. The mobile device 115-*a* then loses connectivity with the first cellular system 100-*a*. Connectivity may be lost due to a power down event (e.g., a battery discharge or a user power off event, or because the mobile device 115-*a* moves out of the coverage area of the first cellular system 100-*a*, or for other reasons. Assuming that the mobile device 115-*a* maintains or regains power, the mobile device 115-*a* may scan for cellular systems to which it may connect. To do this, the mobile device 115-*a* may populate a scan list 205 according to the prioritized order of entries in the MRU database maintained by the mobile device 115-*a*, to determine whether any of the systems specified in the MRU database are available (e.g., to determine whether the mobile device 115-*a* is within the coverage area of any of the systems specified in the MRU). If the mobile device 115-*a* finds that one of the systems specified in the MRU database is available, the mobile device 115-*a* may connect to and camp on that system. If none of the systems specified in the MRU database are available, the next items in the scan list may include entries from a PRL database, which is typically larger than the MRU database.

When the mobile device 115-*a* loses connectivity within the cellular system 100-*a*, but either remains within, returns to, or is powered up within the cellular system 100-*a*, the mobile device 115-*a* may find and connect to the cellular system 100-*a* more quickly as a result of it having added the cellular system 100-*a* to its MRU database. However, if the mobile device 115-*a* was used in other cellular systems before returning to and/or powering up within the cellular system 100-*a*, the cellular system 100-*a* may be deleted from the MRU database of the mobile device 115-*a*, and the mobile device 115-*a* may have to scan a greater portion of the scan list 205, including entries derived from its larger PRL database, to find connection information for the cellular system 100-*a*.

Similarly, when the mobile device 115-*a* loses connectivity within the cellular system 100-*a* and is then moved to or powered up within the cellular system 100-*b*, the mobile device 115-*a* may find and connect to the cellular system 100-*b* more quickly if the cellular system 100-*b* was recently added to its MRU database. However, if the mobile device 115-*a* was never added to the MRU database, or if the mobile device 115-*a* has been used in too many other cellular systems since the cellular system 100-*b* was added to its MRU list, the cellular system 100-*b* may not exist in the MRU database of the mobile device 115-*a*, and the mobile device 115-*a* may have to scan a greater portion of the scan list 205, including entries derived from its larger PRL database, to find connection information for the cellular system 100-*b*.

After camping on either of the cellular systems 100-*a*, 100-*b* shown in FIG. 2, the mobile device 115-*a* may add connection information for the cellular system to its MRU database. However, in accord with various techniques disclosed in this description, the mobile device 115-*a* may also monitor a time that the mobile device 115-*a* is connected to a cellular system 100-*a* or 100-*b* on which it camps. If the connection time exceeds a threshold and/or if the connection time is one of the longest connection times recently experienced by the mobile device 115-*a*, the mobile device 115-*a* may add connection information for the cellular system to a time-based database of connections. In certain examples, when compiling the scan list 205, entries in the scan list based on these longest connections (i.e., time-based entries) may be populated into the scan list 205 with greater priority than entries based on systems identified in the mobile device's PRL database, thus enabling the mobile device 115-*a* to more quickly locate a cellular system on which it camps for longer periods of time.

Although the scan list 205 is shown apart from the mobile device 115-*a* in FIG. 2, it will be understood that the scan list 205 may be stored within the mobile device 115-*a*.

Figure 3:
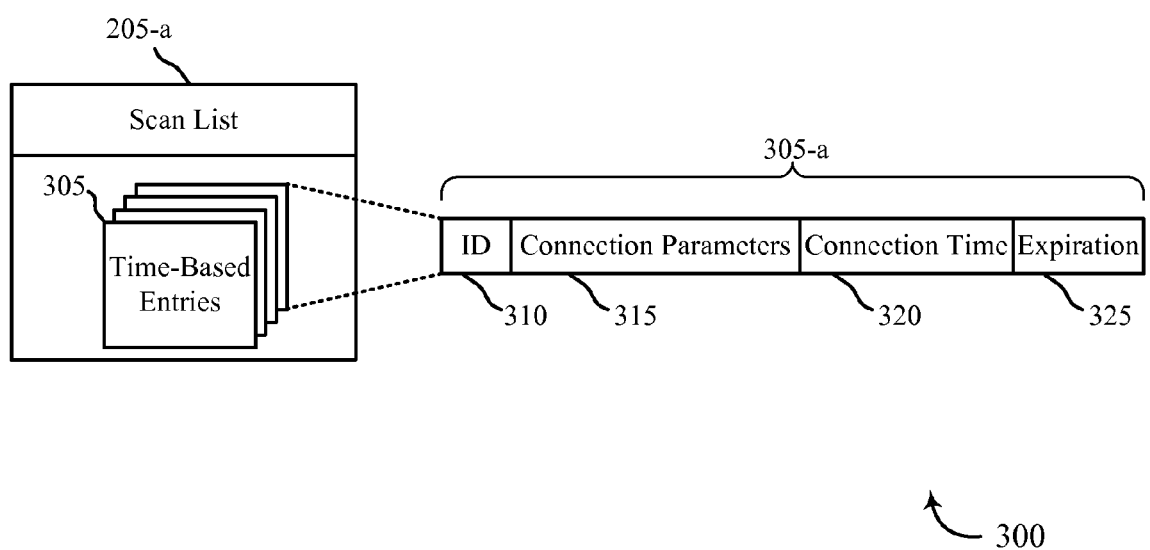
FIG. 3 is an example block diagram showing time-based entries included in a scan list used for system acquisition, in accordance with various embodiments.

FIG. 3 is an example block diagram 300 showing time-based entries 305 included in a scan list 205-*a*. The scan list 205-*a* may be an example of one or more aspects of the scan list 205 described with reference to FIG. 2, and may in some cases be stored in one of the mobile devices 115 shown in FIG. 1 or 2.

As shown, each time-based entry 305-*a* in the scan list 205-*a* may include connection information such as an identifier (or identifiers) 310 and connection parameters 315 (e.g., a RAT, band, server ID, node ID, etc.). Each time-based entry 305-*a* may also include a connection time 320 and an expiration 325. The connection time 320 may be used to identify and prioritize the time-based entry 305-*a* within the time-based entries 305. The expiration 325 may be used to ignore or delete the time-based entry 305-*a* when it is no longer recent or relevant.

In some embodiments, the number of time-based entries populated into the scan list 205-*a* may be relatively small, such as three. A small number of time-based entries enables cellular systems on which a mobile device camps for longer periods of time to found more quickly, despite the fact these systems may not appear in a mobile device's MRU database, and without adding significant overall delay to the scan process should none of the time-based entries be relevant to connecting with the cellular system(s) that are currently within range of the mobile device.

The cellular systems to which time-based entries correspond may often include the cellular systems servicing a user's home and work environments.

Addition of a time-based entry in the scan list 205-*a* may be initially based on a mobile device camping on a particular cellular system for more than a threshold amount of time. The threshold may be predefined, and in some cases may be controlled using a non-volatile (NV) item. In some embodiments, the threshold may be large, such as two or three hours.

If the mobile device has camped on a cellular system for more than the threshold amount of time, a time-based entry for the cellular system may be added to the scan list if a vacant position exists or a time-based has expired. An entry may also be added if the connection time for a particular cellular system exceeds the connection time associated with at least one other time-based entry. In this case, a new time-based entry will be added, and the time-based entry associated with the shortest connection time will be deleted. Time-based entries 305 may be prioritized within the scan list 205-*a* based on length of connection time, with those associated with longer connection times taking priority over those with shorter connection times.

Figure 4:
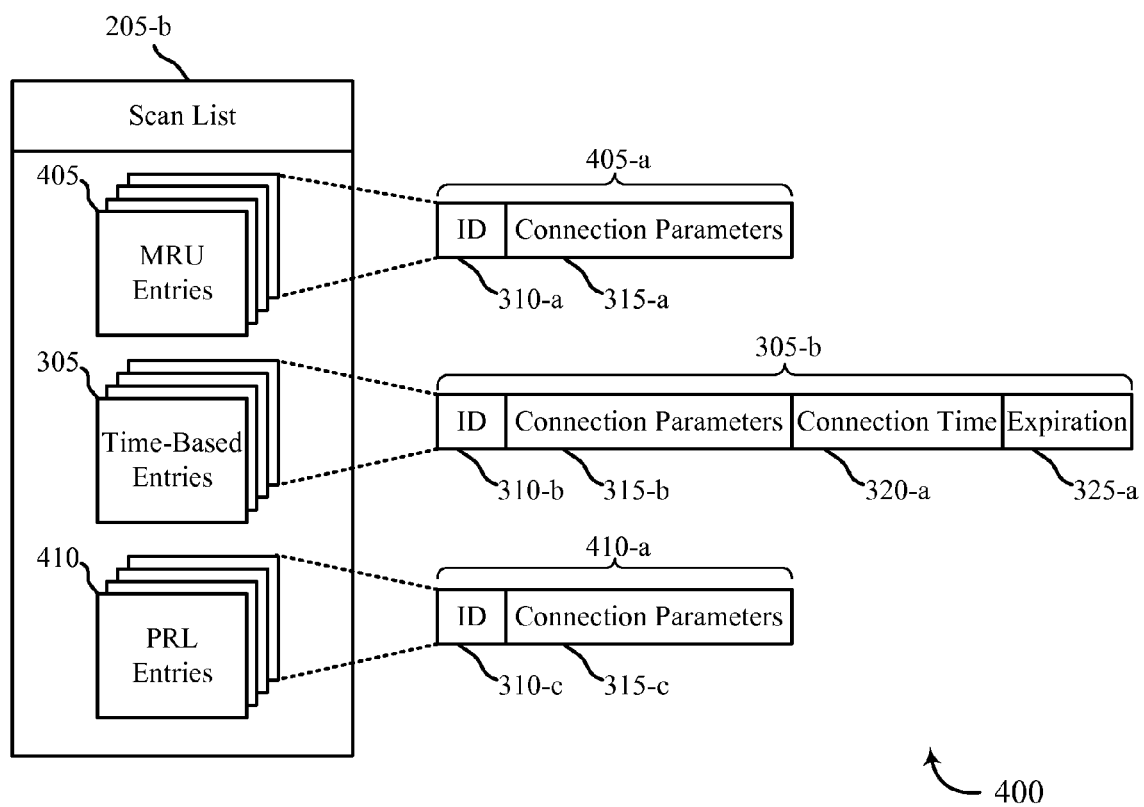
FIG. 4 is an example block diagram showing how different types of entries may be prioritized in a scan list used for system acquisition, in accordance with various embodiments.

FIG. 4 is an example block diagram 400 showing how different types of entries may be prioritized in a scan list 205-b. The scan list 205-b may be an example of one or more aspects of the scan list 205 described with reference to FIG. 2 or 3, and may in some cases be stored in one of the mobile devices 115 shown in FIG. 1 or 2.

The scan list 205-b may include MRU entries 405, time-based entries 305, and/or PRL entries 410. Each time-based entry 305-b may be formatted similarly to the time-based entry 305-a described with reference to FIG. 3. In contrast, each MRU entry 405-a and/or PRL entry 410-a may only include connection information (e.g., identifier(s) 310-a, 310-c and connection parameters 315-a, 315-c) and need not include a connection time or an expiration time. Typically, the number of PRL entries 410 may be greatest and the number of time-based entries 305 may be smallest. In some embodiments, the number of MRU entries may be ten (or about ten), and the number of time-based entries 305 may be three. (or about three).

When a mobile device in which the scan list 205-b is stored loses connectivity with a cellular system (e.g., because of loss of power or loss of service), the mobile device may attempt to find a cellular system to connect to by scanning for the cellular systems identified in the scan list 205-b. The mobile device may first scan for cellular systems identified by the MRU entries. Because a mobile device often moves within a small number of cellular systems, scanning for one or more cellular systems identified in the MRU entries 405 will often lead to a cellular system being found.

In cases where the MRU entries 405 do not identify a cellular system to which the mobile device can connect, the mobile device may scan for one or more cellular systems identified in the time-based entries 305. Because the cellular systems identified in the time-based entries 305 may be ones on which the mobile device camps for longer periods of time, there is a good chance that the mobile device may be within the coverage area of one of these systems. This may especially be so in cases where the mobile device loses power as a result of a dead battery and its user recharges its battery at home or at work.

In cases where a cellular system to which the mobile device may connect is not found within the MRU entries 405 or the time-based entries 305, the mobile device may proceed to scan for one or more cellular systems identified in the PRL entries 410. Because the number of entries in the time-based entries is small, scanning of the time-based entries 305 delays scanning of the PRL entries 410 by only a small amount of time.

Figure 5A:
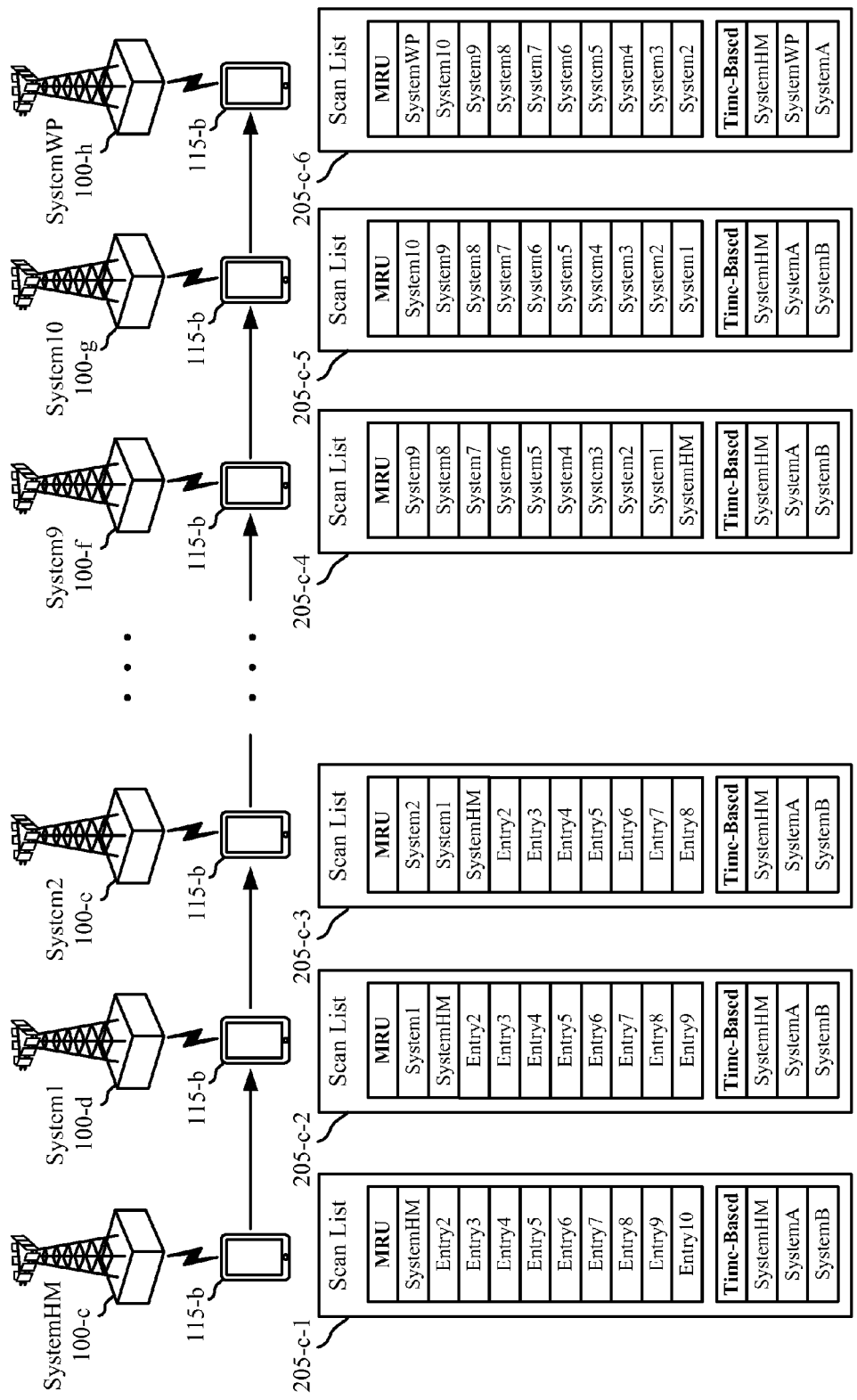
FIGS. 5A & 5B illustrate an example of how a scan list may be populated and used for system acquisition in accordance with various embodiments.
Figure 5B:
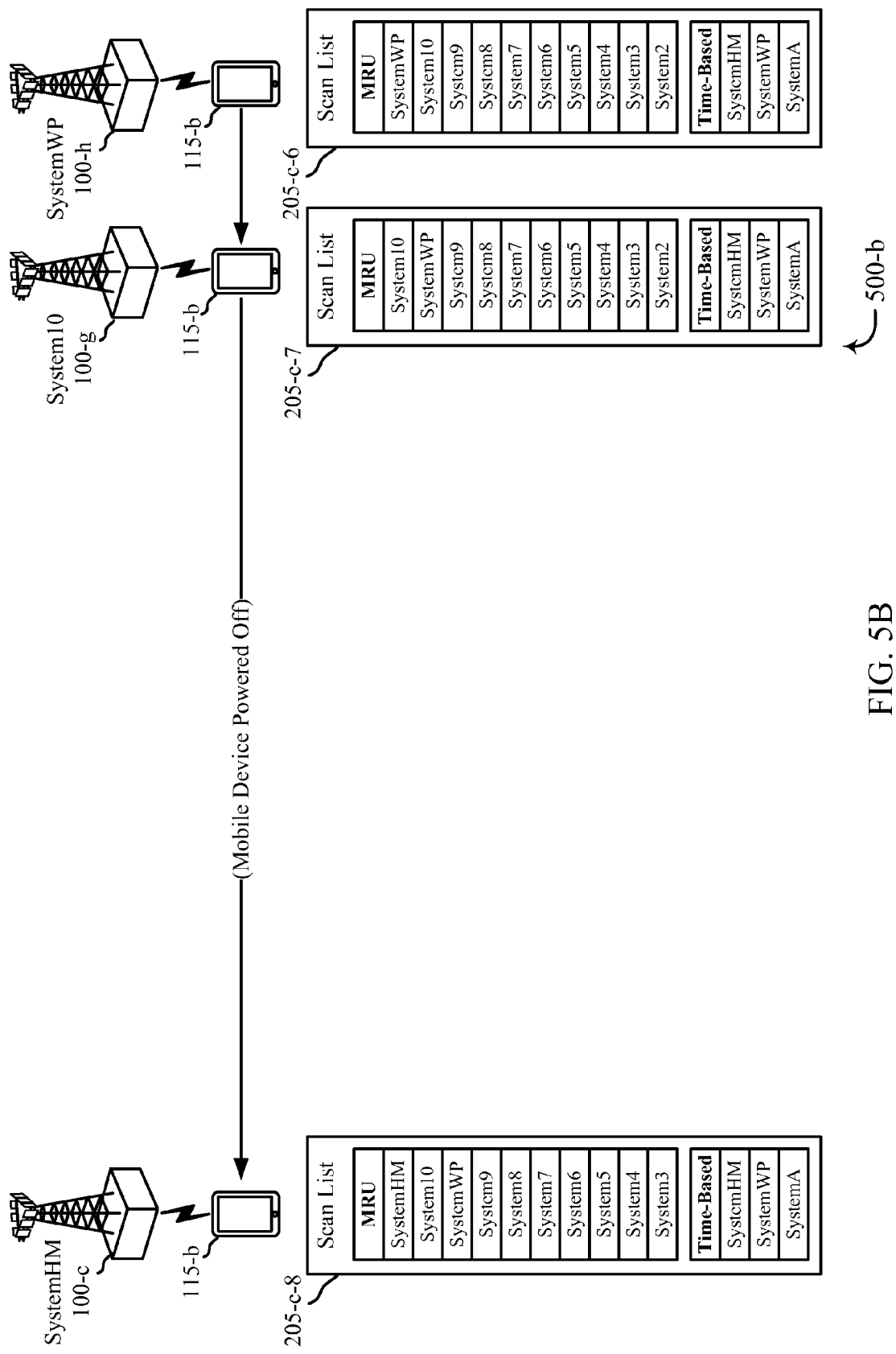

FIGS. 5A & 5B illustrate an example 500-a, 500-b of how a scan list may be populated and used for system acquisition at a mobile device 115-b. The cellular systems 100-c, 100-d, 100-e, 100-f, 100-g, and 100-h may be examples of one or more aspects of a cellular system 100 described with reference to FIG. 1 or 2. The mobile device 115-a may be an example of one or more aspects of a mobile device or UE 115 described with reference to FIG. 1 or 2. The scan list 205-c may be an example of one or more aspects of the scan list 205 described with reference to FIG. 2, 3, or 4, and may be stored in the mobile device 115-b.

By way of example, it may be presumed that, initially, the mobile device 115-b is connected to a System HM 100-c providing coverage to a user's home environment. It may also be presumed that the mobile device 115-b has no MRU entries in its scan list 205-c-1. However, because the mobile device 115-b camps on SystemHM 100-c, an entry for SystemHM is added to the MRU entries of the scan list 205-c-1. While camped on SystemHM 100-c, the mobile device 115-b may monitor its connection time with SystemHM 100-c. At periodic points in time, or upon the occurrence of certain events, the mobile device 115-b may determine whether its connection time with SystemHM 100-c exceeds a threshold. If it does, SystemHM 100-c may be considered as a candidate for addition to the time-based entries of the scan list 205-c-1. However, if the number of time-based entries is limited, the addition of SystemHM 100-c to the time-based entries may occur only if one of the time-based entries is vacant or expired, or only if the connection time with SystemHM 100-c exceeds the connection time associated with another time-based entry. In the example shown, the connection time with SystemHM exceeds the connection times associated with all other time-based entries, and thus, an entry for SystemHM may be given a highest priority within the time-based entries.

As the mobile device 115-b moves out of the coverage area of SystemHM 100-c and into the coverage area of System1 100-d, the scan list 205-c-1 is used to find and establish a connection with System1 100-d. However, because System1 100-d is not referenced by any of the MRU or time-based entries in the scan list 205-c-1, scanning proceeds to the PRL entries of the scan list 205-c-1. For clarity, the PRL entries of the scan list 205-c are not shown in FIGS. 5A & 5B.

Upon finding System1 100-d in a PRL entry of the scan list 205-c-1, the mobile device 115-b may connect to and camps on System1 100-d. The mobile device 115-b may then repeat the processes of adding System1 100-d to the MRU entries of the scan list 205-c-2, and determining whether System1 100-d should be added to the time-based entries of the scan list 205-c-2. In the case of System1 100-d, the mobile device 115-b may not camp on System1 100-d long enough for System1 100-d to be added to the time-based entries of the scan list 205-c-2.

As the mobile device 115-b moves from System1 100-d, to each of System2 through System10, and ultimately to SystemWP 100-h at the mobile device user's work environment, each of the systems 100-e, 100-f, 100-g, 100-h may be found using the scan list 205-c and added to the MRU entries of the scan list 205-c-3, 205-c-4, 205-c-5, or 205-c-6. Furthermore, a determination may be made regarding the addition of each system 100-e, 100-f, 100-g, 100-h to the time-based entries of the scan list 205-c-3, 205-c-4, 205-c-5, or 205-c-6. When the mobile device 115-b camps on SystemWP 100-h at its user's work environment, the entry for System1 may be pushed out of the MRU entries. SystemWP 100-h may also trigger the addition of a time-based entry to the time-based entries of scan list 205-c-6. However, because the connection time of the mobile device 115-b to SystemWP 100-h may be less than the connection time of the mobile device 115-b to SystemHM 100-c, System WP 100-h may be given a lower priority than SystemHM in the time-based entries of the scan list 205-c-6.

Turning now to FIG. 5B, the connections of mobile device 115-b to systems 100-h, 100-g, and 100-c, and consequent updates of the scan list 205-c (e.g., as scan list versions 205-c-7 and 205-c-8) are shown as the mobile device's user returns home. However, while the mobile device 115-b is camped on System10 100-g, and after update of the scan list 205-c-7, the mobile device 115-b may be powered off, possibly due to its battery dying.

When the mobile device 115-b arrives home, is recharged, and is once again powered on, the scan list 205-c-7 may be used to find and establish a connection with SystemHM 100-c. Because SystemHM 100-c may not be referenced by any of the MRU entries in the scan list 205-c-7, scanning proceeds to the time-based entries of the scan list 205-*c*-7. Upon finding SystemHM 100-*c* in the time-based entries, PRL entries do not need to be scanned and the mobile device 115-*b* may be able to connect to SystemHM 100-*c* more quickly than might have been possible if SystemHM 100-*c* had to be found by scanning a possible large number of PRL entries.

After connecting to SystemHM 100-*c*, the mobile device 115-*b* may add an entry for SystemHM 100-*c* to the MRU entries of the scan list 205-*c*-8.

Figure 6:
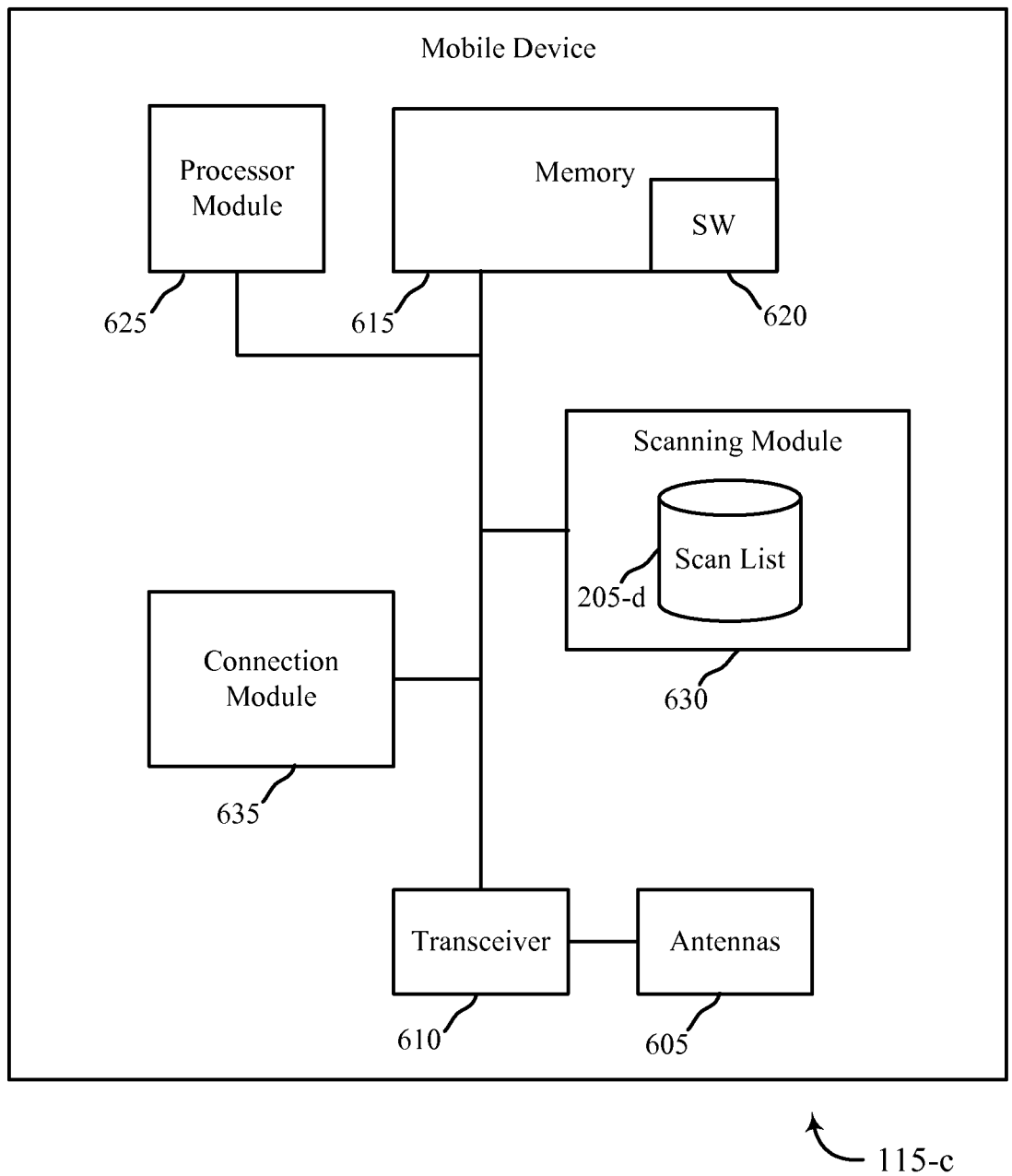
FIG. 6 is a block diagram illustrating a mobile device in accordance with various embodiments.

FIG. 6 is a block diagram 600 of a mobile device 115-*c*. This mobile device 115-*c* may be an example of one or more aspects of a mobile device 115 described with reference to FIG. 1, 2, 5A, or 5B. The mobile device 115-*c* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*c* may have an internal power supply (not shown), such as a small battery, to facilitate mobile operation.

The mobile device 115-*c* may include antennas 605, a transceiver module 610, memory 615, and a processor module 625, which each may be in communication, directly or indirectly, with each other (e.g., via one or more buses). The transceiver module 610 may be configured to communicate bi-directionally, via the antennas 605 and/or one or more wired or wireless links, with one or more networks, as described above. For example, the transceiver module 610 may be configured to communicate bi-directionally with base stations 105 of FIG. 1, 2, 5A, or 5B. The transceiver module 610 may include a modem configured to modulate the packets and provide the modulated packets to the antennas 605 for transmission, and to demodulate packets received from the antennas 605. While the mobile device 115-*c* may include a single antenna, the mobile device 115-*c* will typically include multiple antennas 605 for multiple links.

The memory 615 may include random access memory (RAM) and read-only memory (ROM). The memory 615 may store computer-readable, computer-executable software code 620 containing instructions that are configured to, when executed, cause the processor module 625 to perform various functions described herein (e.g., system acquisition, database management, etc.). Alternatively, the software 620 may not be directly executable by the processor module 625 but be configured to cause the mobile device 115-*c* (e.g., when compiled and executed) to perform functions described herein.

The processor module 625 may include an intelligent hardware device, e.g., a central processing unit (CPU), a microcontroller, an application specific integrated circuit (ASIC), etc. The processor module 625 may include a speech encoder (not shown) configured to receive audio via a microphone, convert the audio into packets (e.g., 30 ms in length) representative of the received audio, provide the audio packets to the transceiver module t10, and provide indications of whether a user is speaking. Alternatively, an encoder may only provide packets to the transceiver module 610, with the provision or withholding/suppression of the packet itself providing the indication of whether a user is speaking.

According to the architecture of FIG. 6, the mobile device 115-*c* may further include a scanning module 630 and a connection module 635. The scanning module 630 may be configured to store a scan list 205-*d* used for system acquisition. The scan list 205-*d* may include a plurality of entries, each of which may include at least one connection parameter for connecting to a cellular system associated with the entry. The entries stored in the scan list 205-*d* may variously include MRU entries, time-based entries, and/or PRL entries, for example. In some embodiments, the scan list 205-*d* may be an example of aspects of the scan list 205 described with reference to FIG. 2, 3, 4, 5A, or 5B. By way of example, the scanning module 630 may be a component of the mobile device 115-*c* in communication with some or all of the other components of the mobile device 115-*c* via a bus. Alternatively, functionality of the scanning module 630 may be implemented as a computer program product, and/or as one or more controller elements of the processor module 625.

The connection module 635 may manage connections with cellular systems, such as the cellular systems 105 shown in FIG. 1, 2, 5A, or 5B. In some embodiments, the connection module 635 may be configured to establish a connection with a target cellular system and then measure a connection time with the target cellular system. By way of example, the connection module 635 may be a component of the mobile device 115-*c* in communication with some or all of the other components of the mobile device 115-*c* via a bus. Alternatively, functionality of the connection module 635 may be implemented as a component of the transceiver module 610, as a computer program product, and/or as one or more controller elements of the processor module 625.

The scanning module 630 may add time-based entries to the scan list 205-*d* based, at least in part, on measured connection times with respective target cellular systems. Each time-based entry may include at least one connection parameter for the target cellular system. Each time-based entry may also include the measured connection time with an associated target cellular system.

The components of the mobile device 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*c*.

Figure 7:
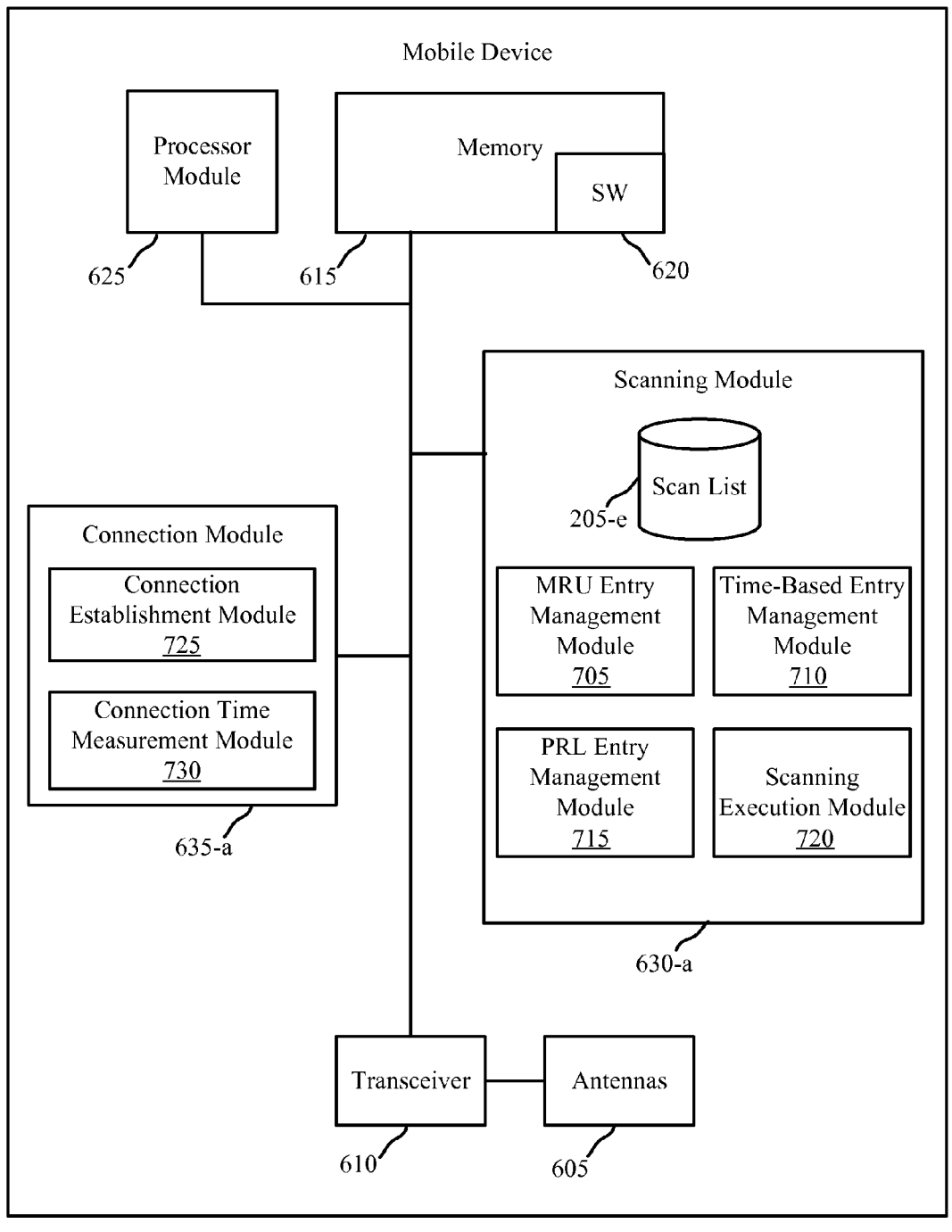
FIG. 7 is a block diagram illustrating another mobile device in accordance with various embodiments.

FIG. 7 is a block diagram 700 of a mobile device 115-*d*. This mobile device 115-*d* may be an example of one or more aspects of a mobile device 115 described with reference to FIG. 1, 2, 5A, 5B, or 6. The antennas 605, transceiver 610, memory 615, software 620, and processor module 625 of the mobile device 115-*d* may be in communication with each other and configured similarly to how these components are configured in the mobile device 115-*c*. These components are not described further in the below description.

The connection module 635-*a* may be an example of one or more aspects of the connection module 635 described with reference to FIG. 6. The connection module 635-*a* may manage connections with cellular systems, such as the cellular systems 105 shown in FIG. 1, 2, 5A, or 5B. As shown, the connection module 635-*a* may include a connection establishment module 725 and/or a connection time measurement module 730. In some embodiments, the connection establishment module 725 may be configured to establish a connection with a target cellular system. The connection time measurement module 730 may then measure a connection time with the target cellular system. The measured connection time may be provided to the scanning module 630-*a*.

In some cases, the measured connection time with the target cellular system may be an elapsed time of a single connection session between the mobile device 115-*d* and a target cellular system. However, in other cases, the measured connection time may be a cumulative elapsed time of a plurality of separate connection sessions between the mobile device 115-*d* and the target cellular system. The latter may be useful when a mobile device 115-*d* camps on a particular cellular system with greater frequency, but maybe not for long connection times.

The scanning module 630-*a* may be an example of one or more aspects of the scanning module 630 described with reference to FIG. 6. As shown, the scanning module 630-*a* may include a scan list 205-*e*, an MRU entry management module 705, a time-based entry management module 710, a PRL entry management module 715, and/or a scanning execution module 720.

The scan list 205-*e* may be used for system acquisition and may include a plurality of entries, each of which may include at least one connection parameter for connecting to a cellular system associated with the entry. The entries stored in the scan list 205-*d* may variously include MRU entries, time-based entries, and/or PRL entries, for example. In some embodiments, the scan list 205-*e* may be an example of aspects of the scan list 205 described with reference to FIG. 2, 3, 4, 5A, 5B, or 6.

The MRU entry management module 705 may receive information on connections established by the connection establishment module 725 and determine when to add an MRU entry to the scan list 205-*e*. Each MRU entry may include connection information such as one or more connection parameters for the target cellular system identified by the MRU entry. The MRU entry management module 705 may also determine the priority or order of MRU entries in the scan list 205-*e*.

The time-based entry management module 710 may also receive information on connections established by the connection establishment module 725, and/or connection times measured by the connection time measurement module 730, and determine when to add a time-based entry to the scan list 205-*e*. More particularly, and in some embodiments, the time-based entry management module 710 may be configured to compare a measured connection time of a target cellular system to a threshold, and then add a time-based entry for the target cellular system to the scan list 205-*e* based at least in part on a determination that the measured connection time with the target cellular system is greater than the threshold. In some cases, the time-based entry management module 710 may be further configured to compare the measured connection time with the target cellular system to a connection time associated with at least one other time-based entry of the scan list, and add a time-based entry for the target cellular system to the scan list only upon making a determination that the measured connection time with the target cellular system is greater than the connection time associated with the at least one other time-based entry of the scan list. In this manner, only cellular systems with which the mobile device 115-*d* has had the longest connection times will be added to the scan list 205-*e*. The time-based entry management module 710 may also determine the priority or order of time-based entries in the scan list 205-*e*, or otherwise arrange the plurality of time-based entries in the scan list such that the time-based entries are ordered according to a connection time associated with each time-based entry. In some embodiments, time-based entries associated with longer connection times are given priority over time-based entries associated with shorter connection times.

The format of each time-based entry added to the scan list 205-*e* may take various forms, and in some cases may take the form indicated in FIG. 3, wherein one or more of an identifier 310, connection parameters 315, a connection time 320, and/or an expiration are associated with each time-based entry.

The MRU entry management module 705 and/or time-based entry management module 710 may in some cases be configured to arrange the entries of the scan list 205-*e* such that the plurality of time-based entries is positioned in the scan list after the plurality of MRU entries. The scanning execution module 720 may then be configured to scan the plurality of time-based entries of the scan list 205-*e* after the plurality of MRU entries of the scan list 205-*e*.

The PRL entry management module 715 may receive information on connections established by the connection establishment module 725 and determine when to add a PRL entry to the scan list 205-*e*. Each PRL entry may include connection information such as one or more connection parameters for the target cellular system identified by the PRL entry. The PRL entry management module 715 may also determine the priority or order of PRL entries in the scan list 205-*e*.

In some embodiments, the connection parameters associated with one or more of the MRU entries, the time-based entries, and/or the PRL entries may include one or more of: band information, channel information, a radio access technology (RAT) identifier, a system identification (SID) number, a network identification (NID) number, or a public land mobile network identification (PLMN ID). A PLMN ID may include a mobile country code (MCC) and a mobile network code (MNC).

The scanning execution module 720 may scan the scan list 205-*e* for purposes of system acquisition. In some embodiments, the scanning execution module 720 may be configured to scan the MRU entries of the scan list 205-*e* first, in accord with a priority order of the MRU entries. The scanning execution module 720 may then scan the time-based entries of the scan list 205-*e*, in accord with a priority order of the time-based entries and, finally, scan the PRL entries of the scan list 205-*e*, in accord with a priority order, if any, of the PRL entries. Upon finding a target cellular system that is currently available to the mobile device 115-*d*, the scanning execution module 720 may cease further scanning of scan list entries. In some cases, operation of the scanning execution module 720 may be triggered by the connection module 635-*a* indicating a disconnect from a previous target cellular system.

Figure 8:
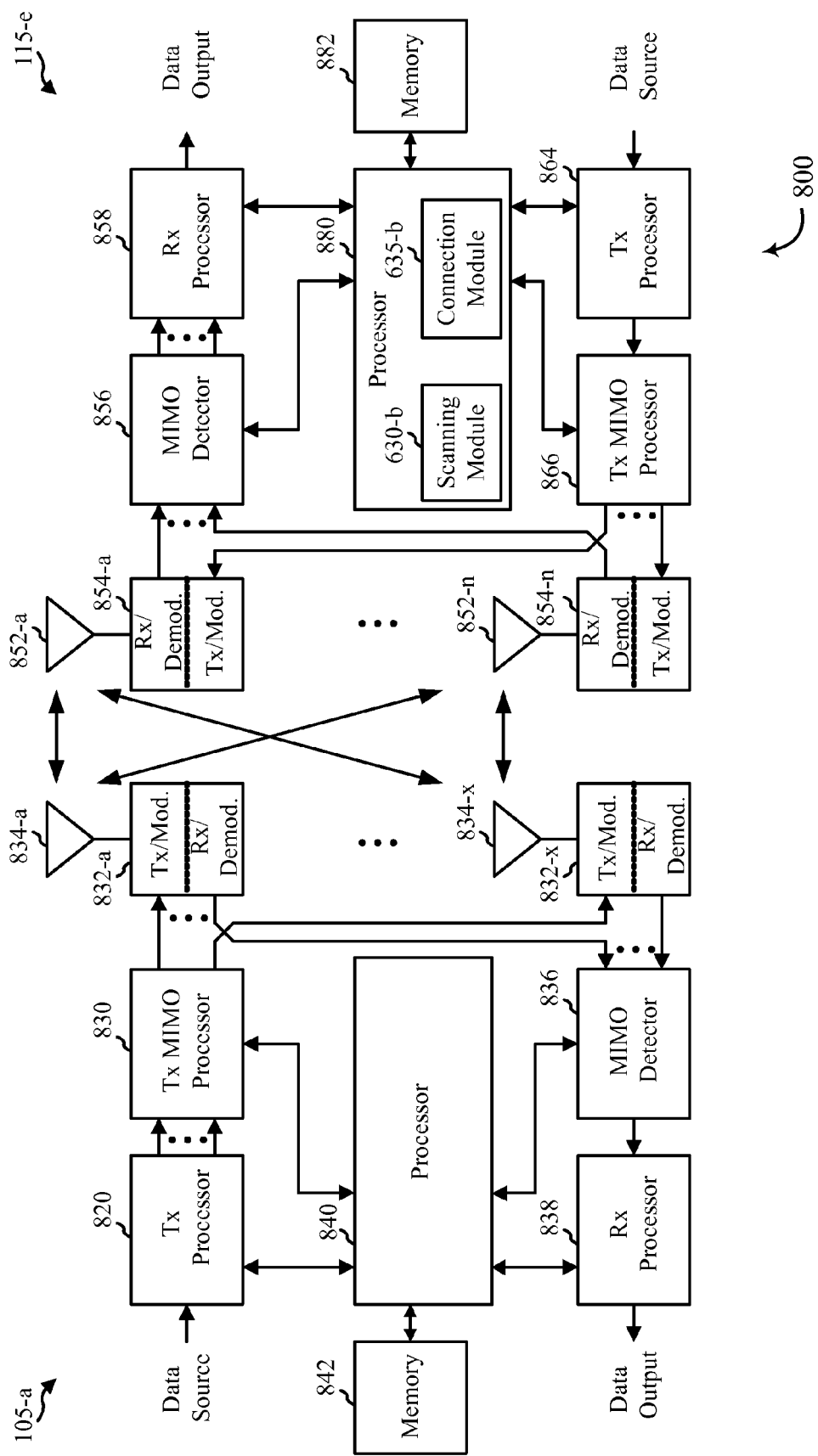
FIG. 8 is a block diagram of a MIMO communications system including an eNB and a UE in accordance with various embodiments.

FIG. 8 is a block diagram of a MIMO communications system 800 including an eNB 105-*a* and a UE 115-*e*. The system 800 may illustrate aspects of the system 100 of FIG. 1 or 2. The eNB 105-*a* may be an example of a base station 105 of FIG. 1 and/or 2. The UE 115-*e* may be an example of a mobile device 115 of FIG. 1, 2, 5A, 5B, 6, and/or 7. The eNB 105-*a* may be equipped with antennas 834-*a* through 834-*x*, and the UE 115-*e* may be equipped with antennas 852-*a* through 852-*n*. In the system 800, the eNB 105-*a* may be able to send data over multiple communication links at the same time. Each communication link may be called a "layer" and the "rank" of the communication link may indicate the number of layers used for communication. For example, in a 2×2 MIMO system where eNB 105-*a* transmits two "layers," the rank of the communication link between the eNB 105-*a* and the UE 115-*e* is two. In some embodiments, the system 800 may support eight layers and have a rank of eight.

At the eNB 105-*a*, a transmit processor 820 may receive data from a data source. The transmit processor 820 may process the data. The transmit processor 820 may also generate reference symbols, and a cell-specific reference signal.

A transmit (TX) MIMO processor 830 may perform spatial processing (e.g., precoding) on data symbols, control symbols, and/or reference symbols, if applicable, and may provide output symbol streams to the transmit modulators 832-*a* through 832-*x*. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. In one example, downlink signals from modulators 832-*a* through 832-*x* may be transmitted via the antennas 834-*a* through 834-*x*, respectively. In one embodiment, the processor 840 may include a reference signal management module 810-*b*. The reference signal management module 810-*b* may be an example of the module 810 shown in FIG. 8 and/or 9, and may generate and map resource element positions to reference signals transmitted in various subframes.

At the UE 115-*e*, the UE antennas 852-*a* through 852-*n* may receive the downlink signals from the eNB 105-*f* and may provide the received signals to the demodulators 854-*a* through 854-*n*, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-*a* through 854-*n*, perform MIMO detection on the received symbols if applicable, and provide detected symbols. A receive processor 858 may process (e.g., demodulate, deinterleave, and decode) the detected symbols, providing decoded data for the UE 115-*e* to a data output, and provide decoded control information to a processor 880, or memory 882. In one embodiment, the processor 880 may include a scanning module 630-*b* and a connection module 635-*b*. The scanning module 630-*b* and connection module 635-*b* may be examples of aspects of the respective modules 630 and 635 shown in FIG. 6 and/or 7, and may be used for purposes of system acquisition when the UE 115-*e* loses connectivity with a cellular system (e.g., due to loss of coverage or loss of power).

On the uplink, at the UE 115-*e*, a transmit processor 864 may receive and process data from a data source. The transmit processor 864 may also generate reference symbols for a reference signal. The symbols from the transmit processor 864 may be precoded by a transmit MIMO processor 866 if applicable, further processed by the demodulators 854-*a* through 854-*n*, and be transmitted to the eNB 105-*a* in accordance with the transmission parameters received from the eNB 105-*a*. At the eNB 105-*a*, the uplink signals from the UE 115-*e* may be received by the antennas 834, processed by the demodulators 832, detected by a MIMO detector 836 if applicable, and further processed by a receive processor. The receive processor 838 may provide decoded data to a data output and to the processor 840. The components of the UE 115-*e* may, individually or collectively, be implemented with one or more Application Specific Integrated Circuits (ASICs) adapted to perform some or all of the applicable functions in hardware. Each of the noted modules may be a means for performing one or more functions related to operation of the system 800.

Similarly, the components of the eNB 105-*a* may, individually or collectively, be implemented with one or more Application Specific Integrated Circuits (ASICs) adapted to perform some or all of the applicable functions in hardware. Each of the noted components may be a means for performing one or more functions related to operation of the system 800.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Figure 9:
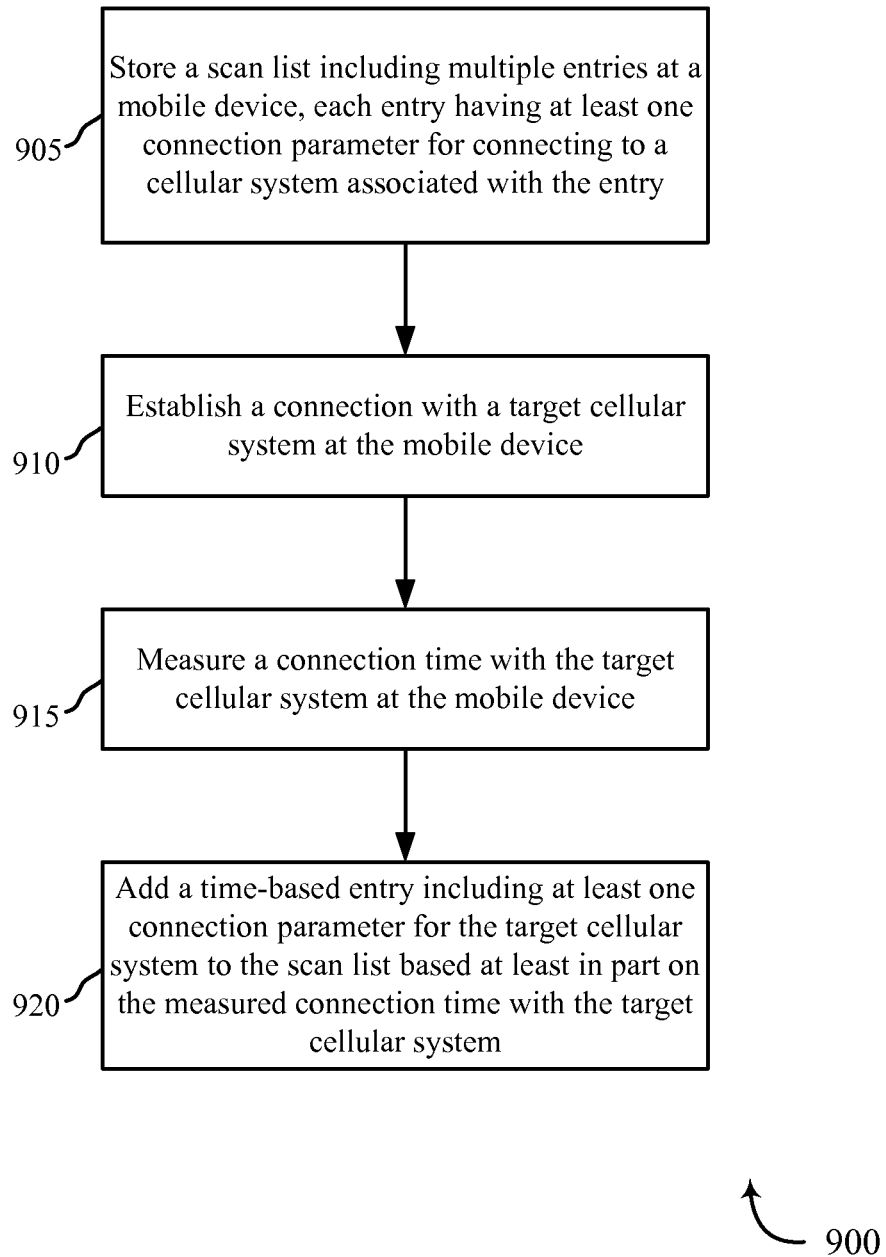
FIG. 9 is a flow chart illustrating a method for system acquisition at a mobile device, in accordance with various embodiments.

FIG. 9 is a flow chart illustrating one embodiment of a method 900 of system acquisition at a mobile device. For clarity, the method 900 is described below with reference to one of the cellular systems 100 shown in FIG. 1, 2, 5A, and/or 5B, and/or with reference to one of the mobile devices 115 shown in FIG. 1, 2, 5A, 5B, 6, 7, and/or 8. In one implementation, the scanning module 630 and connection module 635 shown in FIG. 6 and/or 7 may execute one or more sets of codes to control the functional elements of a mobile device 115 to perform the functions described below.

At block 905, a scan list including multiple entries may be stored at a mobile device 115. The scan list may in some cases be an example of one or more aspects of the scan list 205 shown in FIG. 2, 3, 4, 5A, 5B, 6, and/or 7. Each entry of the scan list 205 may include at least one connection parameter for connecting to a cellular system 100 associated with the entry. The operations at block 905 may in some cases be performed by the scanning module 630.

At block 910, a connection may be established with a target cellular system 100 at the mobile device 115. The operation at block 910 may in some cases be performed by the connection module 635.

At block 915, a connection time with the target cellular system 100 may be measured at the mobile device 115. This operation may also, in some cases, be performed by the connection module 635.

At block 920, a time-based entry including at least one connection parameter for the target cellular system 100 may be added to the scan list 205 based at least in part on the measured connection time with the target cellular system 100. The operation at block 920 may also, in some cases, be performed by the scanning module 630.

Therefore, the method 900 may provide for system acquisition at a mobile device 115, based at least in part on connection times with target cellular systems. It should be noted that the method 900 is just one implementation and that the operations of the method 900 may be rearranged or otherwise modified such that other implementations are possible.

Figure 10:
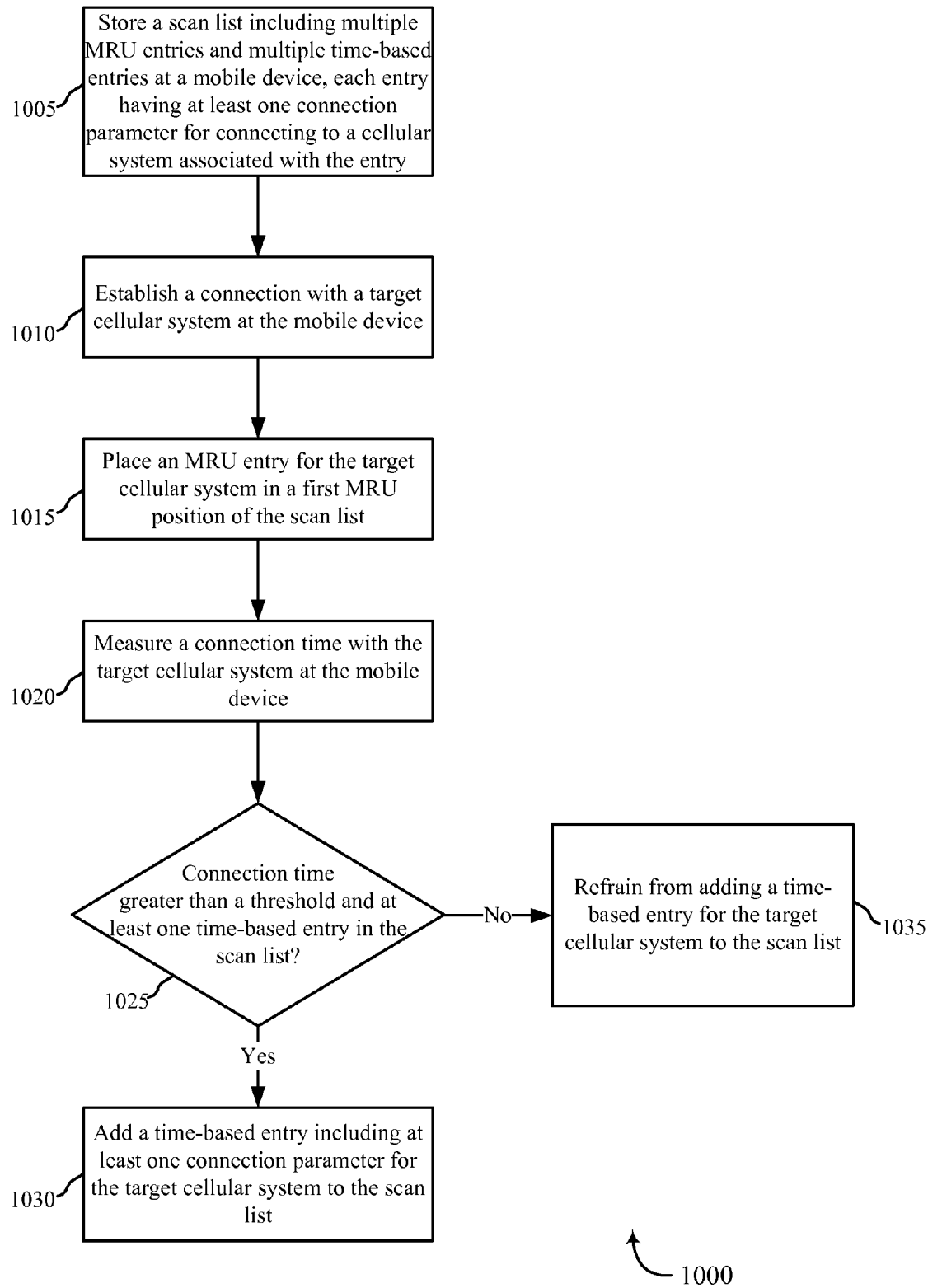
FIG. 10 is a flow chart illustrating another method for system acquisition at a mobile device, in accordance with various embodiments.

FIG. 10 is a flow chart illustrating another embodiment of a method 1000 of system acquisition at a mobile device. For clarity, the method 1000 is described below with reference to one of the cellular systems 100 shown in FIG. 1, 2, 5A, and/or 5B, and/or with reference to one of the mobile devices 115 shown in FIG. 1, 2, 5A, 5B, 6, 7, and/or 8. In one implementation, the scanning module 630 and connection module 635 shown in FIG. 6 and/or 7 may execute one or more sets of codes to control the functional elements of a mobile device 115 to perform the functions described below.

At block 1005, a scan list including multiple MRU entries and multiple time-based entries may be stored at a mobile device 115. The scan list may in some cases be an example of one or more aspects of the scan list 205 shown in FIG. 2, 3, 4, 5A, 5B, 6, and/or 7. Each entry of the scan list 205 may include at least one connection parameter for connecting to a cellular system 100 associated with the entry. The operations at block 1005 may in some cases be performed by the scanning module 630.

At block 1010, a connection may be established with a target cellular system 100 at the mobile device 115. The operation at block 1010 may in some cases be performed by the connection module 635.

At block 1015, an MRU entry for the target cellular system may be placed in a first MRU position of the scan list 205. This operation may in some cases be performed by the scanning module 630 or the MRU entry management module 705.

At block 1020, a connection time with the target cellular system 100 may be measured at the mobile device 115. This operation may also, in some cases, be performed by the connection module 635.

At block 1025, it may be determined whether the measured connection time is greater than a threshold. It is also determined whether the measured connection time is greater than at least one time-based entry in the scan list 205. If the measured connection time is both greater than the threshold and greater than at least one time-based entry in the scan list 205, a time-based entry including at least one connection parameter for the target cellular system is added to the scan list 205 at block 1030. However, if the measured connection time is less than the threshold or less than all of the time-based entries already included in the scan list 205, a time-based entry for the target cellular system is not added to the scan list 205 at block 1035. The operations at blocks 1025, 1030, and 1035 may, in some cases, be performed by the scanning module 630.

Therefore, the method 1000 may provide for system acquisition at a mobile device 115, based at least in part on connection times with target cellular systems. It should be noted that the method 1000 is just one implementation and that the operations of the method 1000 may be rearranged or otherwise modified such that other implementations are possible.

Figure 11:
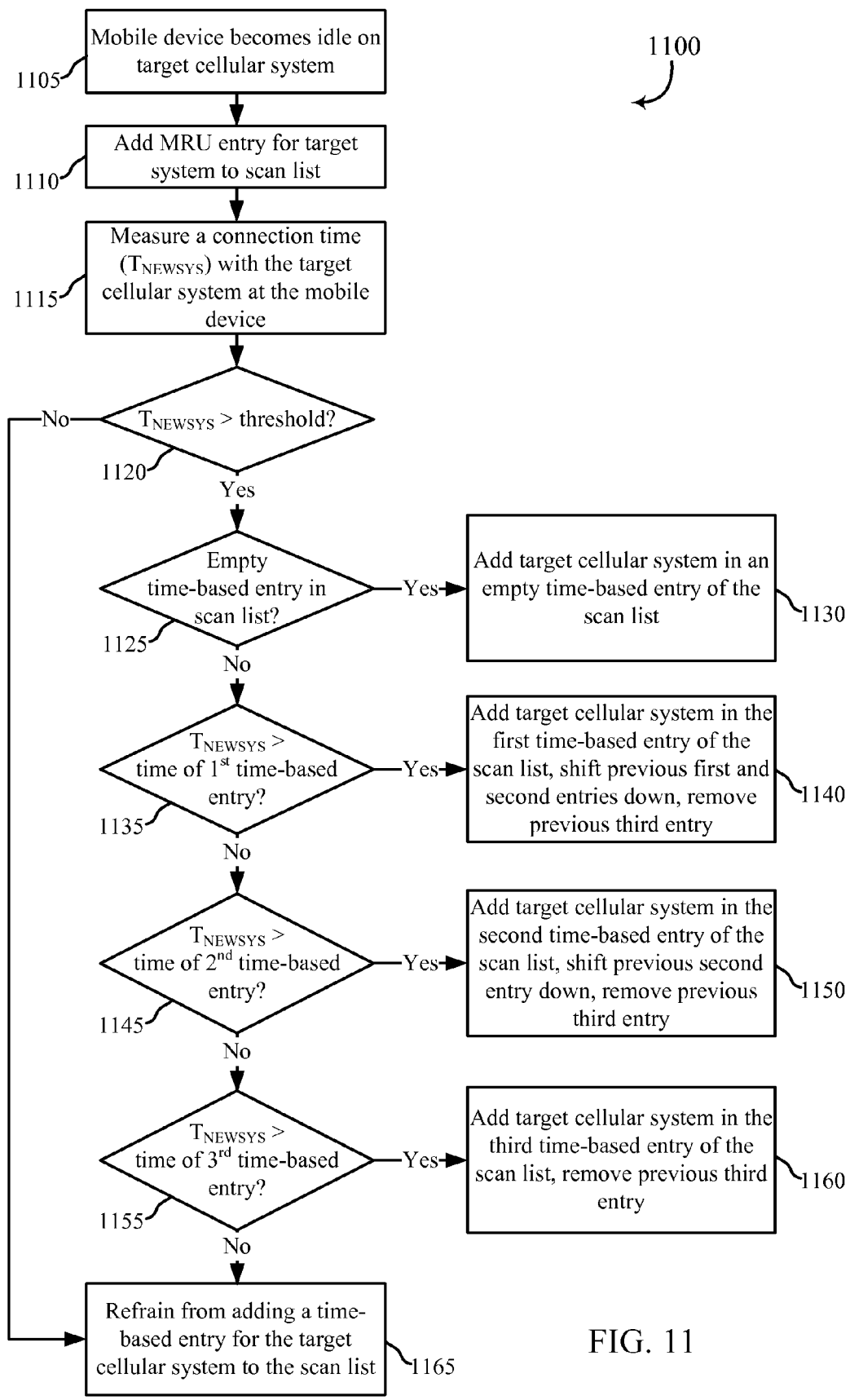
FIG. 11 is a flow chart illustrating yet another method for system acquisition at a mobile device, in accordance with various embodiments.

FIG. 11 is a flow chart illustrating another embodiment of a method 1100 of system acquisition at a mobile device. For clarity, the method 1100 is described below with reference to one of the cellular systems 100 shown in FIG. 1, 2, 5A, and/or 5B, and/or with reference to one of the mobile devices 115 shown in FIG. 1, 2, 5A, 5B, 6, 7, and/or 8. In one implementation, the scanning module 630 and connection module 635 shown in FIG. 6 and/or 7 may execute one or more sets of codes to control the functional elements of a mobile device 115 to perform the functions described below.

At block 1105, a mobile device 115 may become idle (or "camp") on a target cellular system 100. An MRU entry for the target system 100 may then be added to a scan list 205 of the mobile device 115 at block 1110. The operation at block 1105 may in some cases be performed by the connection module 635 or the connection establishment module 725, while the operation at block 1110 may in some cases be performed by the scanning module 630 or the MRU entry management module 705.

At block 1115, a connection time ($T_{NEWSYS}$) with the target cellular system 100 is measured at the mobile device 115. This operation may also, in some cases, be performed by the connection module 635.

At block 1120, it may be determined whether the connection time, $T_{NEWSYS}$, exceeds a defined threshold. If it does not, a time-based entry for the target cellular system is not added to the scan list 205, as indicated at block 1165. However, if the connection time does exceed the defined threshold, the method 1100 continues at block 1125.

At block 1125, it may be determined whether an empty time-based entry exists in the scan list 205. If an empty entry exists, a time-based entry for the target cellular system may be added in an empty entry at block 1130.

If an empty time-based entry in the scan list 205 does not exist, it may be determined at block 1135 whether $T_{NEWSYS}$ is greater than a connection time associated with a first time-based entry in the scan list 205. The first time-based entry may be a time-based entry of greatest priority in the scan list 205. If $T_{NEWSYS}$ is greater, a time-based entry for the target cellular system may be added at the position of the first time-based entry, the former first and second time-based entries may be shifted to the positions of the second and third time-based entries, and (assuming the scan list 205 has only three positions) the third time-based entry may be removed from the scan list 205. These operations all occur at block 1140.

If $T_{NEWSYS}$ is not greater than the connection time associated with the first time-based entry in the scan list 205, it may be determined at block 1145 whether $T_{NEWSYS}$ is greater than a time of the second time-based entry in the scan list 205. The second time-based entry may be a time-based entry of second greatest priority in the scan list 205. If $T_{NEWSYS}$ is greater, a time-based entry for the target cellular system may be added at the position of the second time-based entry, the second time-based entry may be shifted to the position of the third time-based entry, and the third time-based entry may be removed from the scan list 205. These operations may all occur at block 1150.

If $T_{NEWSYS}$ is not greater than the connection time associated with the second time-based entry in the scan list 205, it may be determined at block 1155 whether $T_{NEWSYS}$ is greater than a time of the third time-based entry in the scan list 205. The third time-based entry may be a time-based entry of lowest priority in the scan list 205. If $T_{NEWSYS}$ is greater, a time-based entry for the target cellular system may be added at the position of the third time-based entry, and the third time-based entry may be removed from the scan list 205. These operations all occur at block 1160.

Therefore, the method 1100 may provide for system acquisition at a mobile device 115, based at least in part on connection times with target cellular systems. It should be noted that the method 1100 is just one implementation and that the operations of the method 1100 may be rearranged or otherwise modified such that other implementations are possible.

Figure 12:
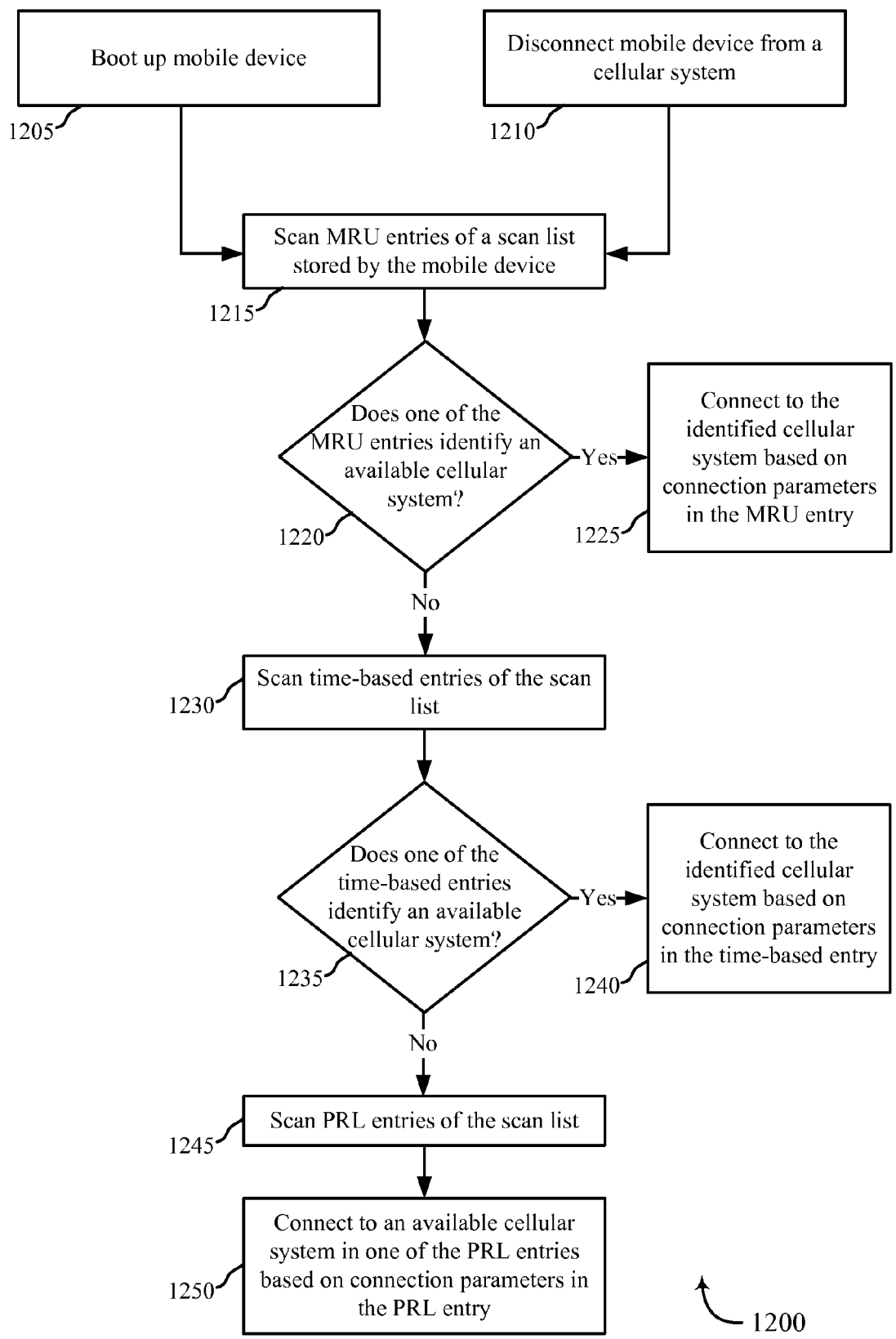
FIG. 12 is a flow chart illustrating another method for system acquisition at a mobile device, in accordance with various embodiments.

FIG. 12 is a flow chart illustrating another embodiment of a method 1200 of system acquisition at a mobile device. For clarity, the method 1200 is described below with reference to one of the cellular systems 100 shown in FIG. 1, 2, 5A, and/or 5B, and/or with reference to one of the mobile devices 115 shown in FIG. 1, 2, 5A, 5B, 6, 7, and/or 8. In one implementation, the scanning module 630 and connection module 635 shown in FIG. 6 and/or 7 may execute one or more sets of codes to control the functional elements of a mobile device 115 to perform the functions described below.

At block 1215, MRU entries of a scan list 205 stored by a mobile device 115 may be scanned. The MRU entries may be scanned upon boot up of the mobile device 115 at block 1205, or upon disconnect of the mobile device 115 from a cellular system 100 at block 1210.

At block 1220, it may be determined whether one of the MRU entries identifies an available cellular system 100. If so, the identified cellular system 100 may be connected to at block 1225, based on connection parameters associated with the MRU entry. Otherwise, the method 1200 may proceed with a scan of time-based entries in the scan list 205 at block 1230.

At block 1235, it may be determined whether one of the time-based entries identifies an available cellular system 100. If so, the identified cellular system 100 may be connected to at block 1240, based on connection parameters associated with the time-based entry. Otherwise, the method 1200 may proceed with a scan of PRL entries in the scan list 205 at block 1245.

At block 1250, a cellular system 100 identified by one of the PRL entries may be connected to, based on connection parameters associated with one of the PRL entries.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores or embodies instructions that are executable by the processor.

The functions described herein may be implemented in hardware, software executed by a processor, firmware, or any combination thereof. If implemented in software executed by at least one processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer readable storage device and communication medium, including any mediums that facilitates transfer of a computer program from one place to another. A storage device may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of computer readable instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of system acquisition at a mobile device, comprising:
storing a scan list comprising a plurality of entries at the mobile device, each entry comprising at least one connection parameter for connecting to a cellular system associated with the entry;
establishing a connection with a target cellular system at the mobile device;
measuring a connection time with the target cellular system at the mobile device; and
adding a time-based entry comprising at least one connection parameter for the target cellular system to the scan list based at least in part on the measured connection time with the target cellular system.

2. The method of claim 1, further comprising:
comparing the measured connection time with the target cellular system to a threshold;
wherein the adding the time-based entry to the scan list is based at least in part on a determination that the measured connection time with the target cellular system is greater than the threshold.

3. The method of claim 1, further comprising:
comparing the measured connection time with the target cellular system to a connection time associated with at least one other time-based entry of the scan list;
wherein the adding the time-based entry to the scan list is based at least in part on a determination that the measured connection time with the target cellular system is greater than the connection time associated with the at least one other time-based entry of the scan list.

4. The method of claim 1, wherein the scan list comprises a plurality of most recently used (MRU) entries and a plurality of time-based entries.

5. The method of claim 4, further comprising: adding an MRU entry with the at least one connection parameter for the target cellular system to the scan list.

6. The method of claim 4, further comprising: arranging the entries of the scan list such that the plurality of time-based entries is positioned in the scan list after a plurality of MRU entries.

7. The method of claim 4, further comprising:
disconnecting from the target cellular system; and
scanning the entries of the scan list to determine whether at least one of the entries of the scan list identifies a cellular system that is currently available to the mobile device.

8. The method of claim 7, wherein the scanning the entries of the scan list comprises: scanning the plurality of time-based entries of the scan list after the plurality of MRU entries of the scan list.

9. The method of claim 8, wherein the scanning the entries of the scan list comprises: scanning a plurality of preferred roaming list (PRL) entries of the scan list after the plurality of time-based entries of the scan list.

10. The method of claim 4, further comprising: arranging the plurality of time-based entries of the scan list such that the time-based entries are ordered according to a connection time associated with each time-based entry.

11. The method of claim 1, further comprising: associating an expiration with the time-based entry.

12. The method of claim 1, wherein the measured connection time with the target cellular system comprises a cumulative elapsed time of a plurality of separate connection sessions between the mobile device and the target cellular system.

13. The method of claim 1, wherein the measured connection time with the target cellular system comprises an elapsed time of a single connection session between the mobile device and the target cellular system.

14. The method of claim 1, wherein the at least one connection parameter associated with each entry comprises one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

15. A mobile device, comprising:
a scanning module configured to store a scan list comprising a plurality of entries at the mobile device, each entry comprising at least one connection parameter for connecting to a cellular system associated with the entry; and
a connection module configured to establish a connection with a target cellular system at the mobile device and measure a connection time with the target cellular system;
wherein the scanning module is further configured to add a time-based entry comprising at least one connection parameter for the target cellular system to the scan list based at least in part on the measured connection time with the target cellular system.

16. The mobile device of claim 15, wherein:
the scanning module is further configured to compare the measured connection time with the target cellular system to a threshold; and
the adding the time-based entry to the scan list is based at least in part on a determination that the measured connection time with the target cellular system is greater than the threshold.

17. The mobile device of claim 15, wherein:
the scanning module is further configured to compare the measured connection time with the target cellular system to a connection time associated with at least one other time-based entry of the scan list; and
the adding the time-based entry to the scan list is based at least in part on a determination that the measured connection time with the target cellular system is greater than the connection time associated with the at least one other time-based entry of the scan list.

18. The mobile device of claim 15, wherein the scan list comprises a plurality of most recently used (MRU) entries and a plurality of time-based entries.

19. The mobile device of claim 18, wherein the scanning module is further configured to: add an MRU entry with the at least one connection parameter for the target cellular system to the scan list.

20. The mobile device of claim 18, wherein the scanning module is further configured to: arranging the entries of the scan list such that the plurality of time-based entries is positioned in the scan list after a plurality of MRU entries.

21. The mobile device of claim 18, wherein:
the connection module is further configured to disconnect from the target cellular system; and
the scanning module is further configured to scan each entry of the scan list to determine whether at least one of the entries of the scan list identifies a cellular system that is currently available to the mobile device.

22. The mobile device of claim 21, wherein the scanning module is further configured to: scan the plurality of time-based entries of the scan list after the plurality of MRU entries of the scan list.

23. The mobile device of claim 22, wherein the scanning module is further configured to: scan a plurality of preferred roaming list (PRL) entries of the scan list after the plurality of time-based entries.

24. The mobile device of claim 18, wherein the scanning module is further configured to: arrange the plurality of time-based entries in the scan list such that the time-based entries are ordered according to a connection time associated with each time-based entry.

25. The mobile device of claim 15, wherein the scanning module is further configured to: associate an expiration with the time-based entry.

26. The mobile device of claim 15, wherein the measured connection time with the target cellular system comprises a cumulative elapsed time of a plurality of separate connection sessions between the mobile device and the target cellular system.

27. The mobile device of claim 15, wherein the measured connection time with the target cellular system comprises an elapsed time of a single connection session between the mobile device and the target cellular system.

28. The mobile device of claim 15, wherein the at least one connection parameter associated with each entry comprises one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

29. A mobile device apparatus, comprising:
means for storing a scan list comprising a plurality of entries at the mobile device, each entry comprising at least one connection parameter for connecting to a cellular system associated with the entry;
means for establishing a connection with a target cellular system at the mobile device;
means for measuring a connection time with the target cellular system at the mobile device; and
means for adding a time-based entry comprising at least one connection parameter for the target cellular system to the scan list based at least in part on the measured connection time with the target cellular system.

30. The mobile device apparatus of claim 29, further comprising:
means for comparing the measured connection time with the target cellular system to a threshold;
wherein the adding the time-based entry to the scan list is based at least in part on a determination that the measured connection time with the target cellular system is greater than the threshold.

31. The mobile device apparatus of claim 29, further comprising:
means for comparing the measured connection time with the target cellular system to a connection time associated with at least one other time-based entry of the scan list;
wherein the adding the time-based entry to the scan list is based at least in part on a determination that the measured connection time with the target cellular system is greater than the connection time associated with the at least one other time-based entry of the scan list.

32. The mobile device apparatus of claim 29, wherein the scan list comprises a plurality of most recently used (MRU) entries and a plurality of time-based entries.

33. The mobile device apparatus of claim 32, further comprising:
means for adding an MRU entry with the at least one connection parameter for the target cellular system to the scan list.

34. The mobile device apparatus of claim 32, further comprising:
means for arranging the entries of the scan list such that the plurality of time-based entries is positioned in the scan list after a plurality of MRU entries.

35. The mobile device apparatus of claim 32, further comprising:
means for disconnecting from the target cellular system; and
means for scanning each entry of the scan list to determine whether at least one of the entries of the scan list identifies a cellular system that is currently available to the mobile device.

36. The mobile device apparatus of claim 35, wherein the means for scanning the entries of the scan list comprises:
means for scanning the plurality of time-based entries of the scan list after the plurality of MRU entries of the scan list.

37. The mobile device apparatus of claim 36, wherein the means for scanning the entries of the scan list comprises:
means for scanning a plurality of preferred roaming list (PRL) entries of the scan list after the plurality of time-based entries of the scan list.

38. The mobile device apparatus of claim 32, further comprising:
means for arranging the plurality of time-based entries of the scan list such that the time-based entries are ordered according to a connection time associated with each time-based entry.

39. The mobile device apparatus of claim 29, further comprising:
means for associating an expiration with the time-based entry.

40. The mobile device apparatus of claim 29, wherein the measured connection time with the target cellular system comprises a cumulative elapsed time of a plurality of separate connection sessions between the mobile device and the target cellular system.

41. The mobile device apparatus of claim 29, wherein the measured connection time with the target cellular system comprises an elapsed time of a single connection session between the mobile device and the target cellular system.

42. The mobile device apparatus of claim 29, wherein the at least one connection parameter associated with each entry comprises one or more of: band information, channel information, a radio access technology (RAT) identifier, a system identification (SID) number, a network identification (NID) number, or a public land mobile network identification (PLM ID) comprising a mobile country code (MCC) and a mobile network code (MNC).

43. A computer program product, comprising:
a non-transitory computer readable storage device comprising computer readable instructions stored thereon, the computer readable instructions comprising:
computer readable instructions configured to cause at least one processor to store a scan list comprising a plurality of entries at the mobile device, each entry comprising at least one connection parameter for connecting to a cellular system associated with the entry;
computer readable instructions configured to cause the at least one processor to establish a connection with a target cellular system at the mobile device;

computer readable instructions configured to cause the at least one processor to measure a connection time with the target cellular system at the mobile device; and computer readable instructions configured to cause the at least one processor to add a time-based entry comprising at least one connection parameter for the target cellular system to the scan list based at least in part on the measured connection time with the target cellular system.

* * * * *